United States Patent
Khosravi et al.

(10) Patent No.: US 11,829,517 B2
(45) Date of Patent: Nov. 28, 2023

(54) METHOD AND APPARATUS FOR TRUST DOMAIN CREATION AND DESTRUCTION

(71) Applicant: INTEL CORPORATION, Santa Clara, CA (US)

(72) Inventors: Hormuzd Khosravi, Portland, OR (US); Dror Caspi, Kiryat Yam (IL); Arie Aharon, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1036 days.

(21) Appl. No.: 16/227,858

(22) Filed: Dec. 20, 2018

(65) Prior Publication Data

US 2019/0147192 A1    May 16, 2019

(51) Int. Cl.
   *G06F 21/72*   (2013.01)
   *G06F 9/455*   (2018.01)
   (Continued)

(52) U.S. Cl.
   CPC .......... *G06F 21/72* (2013.01); *G06F 9/45558* (2013.01); *G06F 9/5016* (2013.01); *G06F 21/575* (2013.01); *H04L 9/088* (2013.01); *H04L 9/0894* (2013.01); *H04L 9/0897* (2013.01); *G06F 2009/45583* (2013.01); *G06F 2009/45587* (2013.01)

(58) Field of Classification Search
   None
   See application file for complete search history.

(56) References Cited

U.S. PATENT DOCUMENTS 8,645,665 B1 * 2/2014 Bennett ................. G06F 12/109
                                                       711/206
9,804,871 B2 * 10/2017 Neiger ..................... G06F 9/455
(Continued)

FOREIGN PATENT DOCUMENTS

EP         3367287 A1    8/2018

OTHER PUBLICATIONS

Intel, "Intel® Architecture Memory Encryption Technologies Specification", dated Dec. 1, 2017, pp. 1-30, downloaded from the Internet, URL: http://kib.kiev.ua/x86docs/Intel/MemEncryption/336907-001.pdf (Year: 2017).*

(Continued)

*Primary Examiner* — Linglan Edwards
*Assistant Examiner* — Vy H Ho
(74) *Attorney, Agent, or Firm* — Nicholson De Vos Webster & Elliott LLP

(57) ABSTRACT

A method of creating a trusted execution domain includes initializing, by a processing device executing a trust domain resource manager (TDRM), a trust domain control structure (TDCS) and a trust domain protected memory (TDPM) associated with a trust domain (TD). The method further includes generating a one-time cryptographic key, assigning the one-time cryptographic key to an available host key id (HKID) in a multi-key total memory encryption (MK-TME) engine, and storing the HKID in the TDCS. The method further includes associating a logical processor to the TD, adding a memory page from an address space of the logical processor to the TDPM, and transferring execution control to the logical processor to execute the TD.

20 Claims, 20 Drawing Sheets

(51) Int. Cl.
    *G06F 9/50*     (2006.01)
    *H04L 9/08*     (2006.01)
    *G06F 21/57*     (2013.01)

(56) References Cited

U.S. PATENT DOCUMENTS

| | | | | |
|---|---|---|---|---|
| 9,847,994 | B1* | 12/2017 | Kelly | H04L 63/067 |
| 10,404,667 | B2* | 9/2019 | Iyer | H04L 63/0478 |
| 10,445,238 | B1* | 10/2019 | Diestelhorst | G06F 9/4401 |
| 10,496,666 | B1* | 12/2019 | Kurtic | G06F 16/254 |
| 2012/0016695 | A1* | 1/2012 | Bernard | G06Q 40/08 |
| | | | | 705/4 |
| 2013/0111203 | A1* | 5/2013 | Baltes | H04L 9/3247 |
| | | | | 713/100 |
| 2013/0208892 | A1* | 8/2013 | Moriguchi | G06F 21/805 |
| | | | | 380/277 |
| 2014/0164723 | A1* | 6/2014 | Garthwaite | G06F 9/461 |
| | | | | 711/162 |
| 2015/0248357 | A1* | 9/2015 | Kaplan | G06F 12/1036 |
| | | | | 713/193 |
| 2017/0034303 | A1* | 2/2017 | Hinrichs | H04L 67/34 |
| 2017/0039242 | A1* | 2/2017 | Milton | H04W 4/02 |
| 2017/0177377 | A1* | 6/2017 | Thiyagarajah | G06F 9/4406 |
| 2017/0250798 | A1* | 8/2017 | Enga | H04L 9/0643 |
| 2019/0087506 | A1* | 3/2019 | Choh | G06F 16/951 |
| 2020/0233919 | A1* | 7/2020 | Howe | G06F 16/9014 |

OTHER PUBLICATIONS

Costan, "SGX_2016-086, Intel SGX Explained", dated Feb. 7, 2016, pp. 1-118, downloaded on Dec. 9, 2021 from the Internet URL: http://web.archive.org/web/20160301000000*/https://eprint.iacr.org/2016/086.pdf (Year: 2016).*
"Intel 64 and IA-32 Architectures Software Developer's Manual Volume 3D: System Programming Guide, Part 4", Sep. 2016; Intel Corporation, 224 pages.
"Intel Architecture Memory Encryption Technoogies Specification" Dec. 2017, Intel Corporation, 30 pages.
Extended European Search Report for European Patent Application No. 19203451.0 dated Feb. 10, 2020, 8 pages.
Intel: "Intel 64 and IA-32 Architectures Software Developer's Manual Volume 3D: System Programming Guide, Part 4", Nov. 1, 2018, XP055661491, Retrieved from the Internet: URL:https://kib.kiev.ua/x86docs/Intel/SDMs/332831-068.pdf [retrieved on Jan. 23, 2020].
Intention to Grant, EP App. No. 19203451, dated Mar. 11, 2021, 8 pages.
Decision to grant a European patent, EP App. No. 19203451, dated Jul. 8, 2021, 2 pages.

* cited by examiner

METHOD AND APPARATUS FOR TRUST DOMAIN CREATION AND DESTRUCTION

TECHNICAL FIELD

Embodiments described herein generally relate to computer systems; more specifically, to hardware-assisted trusted execution domains.

BACKGROUND

Modern processing devices employ disk encryption to protect data at rest. However, data in memory is in plaintext and vulnerable to attacks. Attackers can use a variety of techniques including software and hardware-based bus scanning, memory scanning, hardware probing, etc. to retrieve data from memory. This data from memory could include sensitive data, including privacy-sensitive data, IP-sensitive data, and also keys used for file encryption or communication. The exposure of data is further exacerbated with the current trend of moving data and enterprise workloads into the cloud utilizing virtualization-based hosting services provided by cloud service providers.

DETAILED DESCRIPTION OF DRAWINGS

Figure 1A:
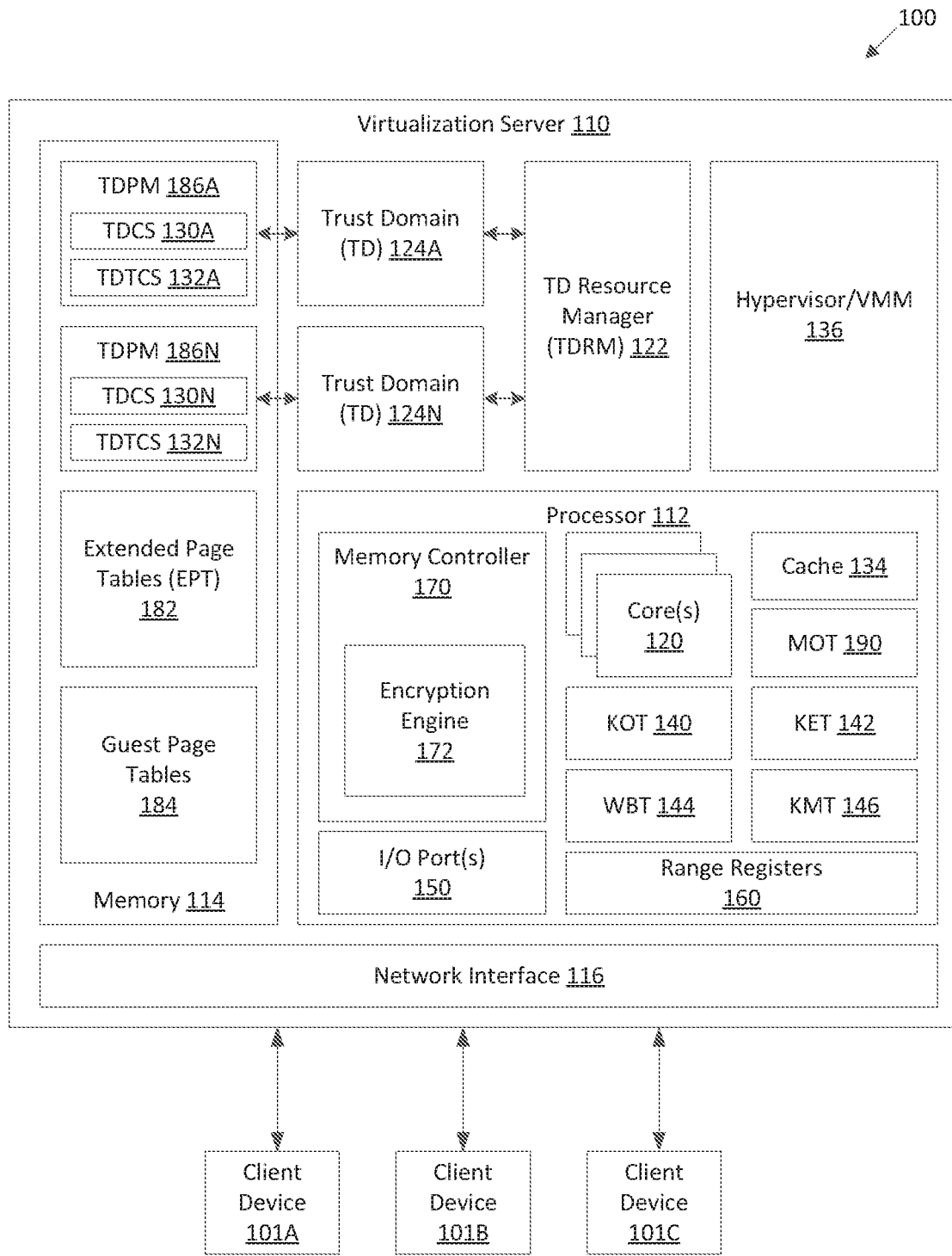
FIG. 1A illustrates a block diagram of an example computing system that provides isolation in virtualized systems using trust domains (TDs), according to embodiments of the present disclosure.

Aspects of the present disclosure are directed at creating and destroying a trust domain (TD). A TD refers to a secure software execution environment that can support a customer (e.g., tenant) workload. The tenant workload may include an operating system (OS), along with other applications running on top of the OS. The tenant workload may also include a virtual machine (VM) running on top of a virtual machine monitor (VMM), along with other applications.

Conventional cloud server computing environments provide remote computing resources and remote data storage resources for various devices. While a tenant is accessing remote computing and data storage provided by a cloud service provider (CSP), it is especially important for data to be protected from access by unauthorized persons and malicious software. Unencrypted plaintext data residing in memory, as well as data moving between the memory and a processor, may be vulnerable to a variety of attacks. Attackers may use a variety of techniques (e.g., bus scanning, memory scanning, etc.) to retrieve data from memory. In some instances, data may include keys or other information used to encrypt sensitive data.

Total Memory Encryption (TME) technology provides one solution to protect data in memory. TME allows memory accesses by software executing on a processor core to be encrypted using an encryption key. For example, the encryption key may be a 128-bit key generated at a boot time and used to encrypt data sent to external memory buses. In particular, when the processor makes a write request to memory, the data may be encrypted by a memory encryption engine before being sent to memory, where it is stored in an encrypted form. When the data is read from memory, the data is sent to the processor in the encrypted form and is decrypted by the encryption key when it is received by the processor. Because data remains in the processor in the form of plaintext, the TME technology does not require modification to the existing software and how the existing software interacts with the processor.

A multi-key TME (MK-TME) technology is an extension of TME technology that provides support for multiple encryption keys. This allows for compartmentalized memory encryption. For example, the processor architecture may allow multiple encryption keys to be generated during the boot process (i.e., the operations performed by a computing system when the system is first powered on), which are to be used to encrypt different memory pages. Key identifiers (IDs) associated with the encryption keys may be used by various hardware and software components as part of the TME and MK-TME technologies. The multi-key extension is particularly suited to work with multi-domain architectures, such as architectures used by CSPs because the number of supported keys may be implementation dependent.

In some implementations, CSPs have a choice to designate pages of a VM to be encrypted using a VM-specific key. In other instances, a CSP may choose specific VM pages to remain in plaintext or to be encrypted using different ephemeral keys that may be opaque to software. A MK-TME engine may be used to support different pages to be encrypted using different keys. The MK-TME engine may support at least one key per domain and therefore achieve cryptographic isolation between different workloads present on a CSP. A workload may be associated with a tenant or owner (e.g., an entity that leases usage of the host server from the CSP).

In implementations of this disclosure, a TD architecture and instruction set architecture (ISA) extensions (referred to herein as TD extensions (TDX)) is provided. TDX allows for multiple secure TDs corresponding to different client machines (e.g., VMs), guest operating systems, host operating systems, hypervisors, or the like. Additionally, different applications run by the same client within the same guest OS may be executed securely using multiple TDs. Each TD may use one or more private keys that are not available to software executing outside the TD. In some embodiments, software executing in one TD may have access to private keys specific to that particular domain and to shared keys that may be used by multiple TDs. For example, a software running inside a TD may use a private key for its secure execution (e.g., read, write, execute operations), and the same software may use a shared key to access structures or devices shared with other TDs (e.g., printers, keyboard, mouse, monitor, network adapter, router, etc.).

A TD may be secured even from privileged users, such as the OS (either host or guest), VMM, basic input/output system (BIOS) firmware, system management mode, and the like. If malicious software takes over a privileged domain, such as the OS, sensitive data stored in memory by the TD will remain protected.

Each TD may operate independently of other TDs and use logical processor(s), memory, and I/O assigned by a trust domain resource manager (TDRM). The TDRM may operate as part of the host OS, the hypervisor, or as a separate software program, and has full control of the cores and other platform hardware. The TDRM assigns logical processors (e.g., execution threads of a physical processor) to TDs, however, may not access the TD's execution state on the assigned logical processor(s). Similarly, a TDRM may assign physical memory and I/O resources to the TDs, but may not be privy to access the memory state of a TD due to the use of separate encryption keys. Software executing in a TD may operate with reduced privileges (e.g., tenant software may not have full access to all resources available on the host system) so that the TDRM can retain control of platform resources. However, the TDRM cannot affect the confidentiality or integrity of the TD state in memory or in the CPU structures under defined circumstances.

TDX may operate concurrently with other virtualization architecture extensions, such as VMX. VMX allows multiple operating systems to simultaneously share processor resources in a safe and efficient manner. A computing system with VMX may function as multiple virtual systems or VMs. Each VM may run OSes and applications in separate partitions. VMX also provides a layer of system software called the virtual machine monitor (VMM), used to manage the operation of virtual machines (c.f., TDRM).

VMX may provide a virtual machine control structure (VMCS) to manage VM transitions (e.g., VM entries and VM exits). A VM entry is a transition from VMM into VM operation. VM entries may be triggered by an instruction executed by the VMM. A VM exit is a transition from VM operation to the VMM. VM exits may be triggered by hardware events requiring an exit from the VM. For example, a page fault in a page table supporting the VM may cause a VM exit. The VMCS may be a 6-part data structure to manage VM transitions. The VMCS may keep track of: a guest state area (e.g., the processor state when a VM exit occurs, which is loaded on VM entries); a host state area (e.g., the processor state that is loaded on VM exits); VM-execution control fields (e.g., fields that determine the causes of VM exits); VM-exit control fields; VM-entry control fields; and VM-exit information fields (e.g., files that receive information on VM exits and describe the cause and nature of the VM exit).

In some implementations, TDX may operate as a substitute for VMX, which includes many of the features of VMX and adds an additional layer of security, in accordance with embodiments described herein. In other implementations, TDX may operate concurrently with VMX. For example, a CSP host server running virtualization architecture (e.g., VMX) may need to utilize both MK-TME technology and TDX architecture for efficient execution of tenant software. A host server may execute highly sensitive applications within TDs so that the hypervisor executing VMs does not have access to the memory pages and encryption keys allocated to a TD and its trusted computing base (TCB). A TCB refers to a set of hardware, firmware, and/or software components that have an ability to influence the trust for the overall operation of the system. At the same time, the host server may run applications that demand less security and isolation using MK-TME technology where the hypervisor retains control over memory pages and encryption keys used in these less sensitive applications. The VMM may then isolate different applications from each other using different MK-TME keys, but still remain in the TCB of each application.

Aspects of the present disclosure, in various implementations, address the need to enable coexistence of the MK-TME technology and the TDX architecture. In some implementations, the disclosed computing system may ensure that key IDs allocated to TDs cannot be used by MK-TME software, such as the hypervisor or VMs running outside the TCB of the TD. In related implementations, the disclosed architectures may ensure that no key ID that is designated as a restricted key ID for the TD may be used concurrently by two active TDs. It may also be desirable, for additional safety of data stored in TDs, that key IDs of extinct TDs may be reallocated to other TDs after all cache data associated with the extinct TD is flushed.

Moreover, even within a highly-secure TD, a client may need to communicate with shared structures, e.g., shared hardware devices. For example, input-output (I/O) devices, printers, network adapters, routers, or other processing devices, and the like, may be used by multiple TDs and by the hypervisor running VMs using the MK-TME protections. In implementations, the access to such shared structures may still need to be secured (from other applications or external malicious attacks) by encrypting memory transactions related to operations of the shared structures. Accordingly, a TD may need to be able to use different encryption keys—at least one restricted key for its secure operations and access to the TD's private memory pages and at least one non-restricted key for the TD's communications with the shared structures. Software operating in a TCB of a TD may attempt to use a non-restricted key for memory transactions involving private memory pages. For example, trusted software may attempt to write data into a private memory page using a non-restricted key. In the absence of a hardware protection disclosed in the instant specification, such data may be vulnerable to a software access (e.g., a read operation) from a program outside the TCB that may gain access to the shared non-restricted key.

Conventional systems for providing isolation in virtualized systems do not remove the CSP software out of the tenant's TCB completely. Furthermore, conventional systems may increase the TCB significantly using separate chipset subsystems that implementations of this disclosure avoid. The TD architecture of this disclosure provides isolation between customer (tenant) workloads and CSP software by removing the CSP software from the TCB, thus explicitly reducing the TCB. Implementations provide a technical improvement over conventional systems by providing secure isolation for CSP customer workloads (tenant TDs) and allow for the removal of CSP software from a customer's TCB while meeting security and functionality requirements of the CSP. In addition, the TD architecture may be scalable to multiple TDs, which can support multiple tenant workloads. Furthermore, the TD architecture described herein can be applied to any dynamic random access memory (DRAM), or storage class memory (SCM)-based memory, such as Non-Volatile Dual In-line Memory Module (NVDIMM). As such, implementations of the disclosure allow software to take advantage of performance benefits, such as NVDIMM direct access storage (DAS) mode for SCM, without compromising platform security requirements.

Referring now to the figures, FIG. 1A illustrates a schematic block diagram of a computing system 100 that may provide isolation in virtualized systems using TDs, according to implementations of this disclosure. Computing system 100 may include a virtualization server 110 that includes a processor 112, a memory 114, and a network interface 116. Processor 112 may implement TD architecture and ISA extensions for the TD architecture (e.g., TDX).

TD 124A, 124N may be executed as part of the TD architecture implemented by processor 112. TD 124A, 124N may refer to a software execution environment to support a customer (e.g., tenant) workload. The tenant workload may include an OS, along with other applications running on top of the OS. The tenant workload may also include a VM running on top of a VMM. The TD architecture may provide a capability to protect the tenant workload running in a TD 124A, 124N by providing isolation between TD 124A, 124N and other software (e.g., CSP-provided software) executing on processor 112. The TD architecture does not impose any architectural restrictions on the number of TDs operating within a system, however, software and hardware limitations may limit the number of TDs running concurrently on a system due to other constraints.

A tenant workload may be executed within a TD 124A, 124N when the tenant does not trust a CSP to enforce confidentiality. In order to operate in accordance with implementations of this disclosure, a CPU on which the TD is to be executed must support the TD architecture. In one embodiment, the tenant workload may include a VM running on top of a VMM. As such, a virtualization mode (e.g., VMX) may also be supported by the CPU on which the TD is to be executed. In another embodiment, TD 124A, 124N may not operate using a virtualization mode, but instead may run an enlightened operating system (OS) within TD 124A, 124N.

The TD architecture may provide isolation between TD 124A, 124N and other software executing on processor 112 through functions including memory encryption, TD resource management, and execution state and management isolation capabilities. Memory encryption may be provided by an encryption circuit of processor 112 (e.g., encryption engine 172). In embodiments of this disclosure, encryption engine 172 may be a multi-key total memory encryption (MK-TME) engine illustrated in FIG. 3. Total Memory Encryption (TME) technology allows memory accesses by software executing on a processor core to be encrypted using an encryption key. Multi-key TME technology may be an extension of TME that provides support for multiple encryption keys, thus allowing for compartmentalized encryption. Memory encryption may be further supported by several key tables maintained by processor 112 (e.g., key ownership table (KOT) 140 and key encryption table (KET) 142). The key tables may be stored in on-chip memory, where the on-chip memory is not directly accessible by software executed by the processing device. The on-chip memory may be physically located on the same chip as the processing core. Resource management capability may be provided by a TDRM 122. Execution state and management capabilities may be provided by a memory ownership table (MOT) 190 and access-controlled TD control structures, such as a trust domain control structure (TDCS) 130A, 130N and a trust domain thread control structure (TDTCS) 132A, 132N. More detail regarding the function of these components is described below with reference to FIG. 1B.

TDRM 122 represents a resource management layer of the TD architecture. In some embodiments, TDRM 122 may be implemented as part of the CSP/root VMM (e.g., a primary VMM that manages machine level operations of VMM and VMs). TDRM 122 may be a software module included as part of the TD architecture that manages the operation of TDs 124A, 124 N. TDRM 122 may act as a host and have control of the processor and other platform hardware. TDRM 122 may assign software in a TD with logical processor(s) and may also assign physical memory and I/O resources to a TD. While TDRM 122 may assign and manage resources, such as CPU time, memory, and I/O access to TDs 124A, 124N, TDRM 122 may operate outside of the TCB of TDs 124A, 124N. For example, TDRM may not access a TD's execution state on the assigned logical processor(s) and may not be privy to access/spoof the memory state of a TD. This may be enforced by the use of separate encryption keys and other integrity/replay controls on memory.

Virtualization server 110 may support a number of client devices 101A-101C. TDs may be accessible by client devices 101A-101C via network interface 116. Client devices 101A-101C may communicate with each other, and with other devices, via software executing on processor 112 (e.g., CSP-provided software). TD 124A, 124N may refer to a tenant workload that client devices 101A-101C execute via processor 112. As discussed previously, the tenant workload may include an OS as well as ring-3 applications running on top of the OS. The tenant workload may also include a VM running on top of a VMM (e.g., hypervisor) along with other ring-3 applications, in accordance with embodiments described herein. Each client device 101A-101C may include, but is not limited to, a desktop computer, a tablet computer, a laptop computer, a netbook, a netbook computer, a personal digital assistant (PDA), a server, a workstation, a cellular telephone, a mobile computing device, a smart phone, an Internet appliance or any other type of computing device.

Processor 112 may include one or more cores 120 (also referred to herein as processing cores 120), range registers 160, a memory controller 170 (e.g., a memory management unit (MMU)), and I/O ports 150. Processor 112 may be used in a computing system 100 that includes, but is not limited to, a desktop computer, a tablet computer, a laptop computer, a netbook, a notebook computer, a PDA, a server, a workstation, a cellular telephone, a mobile computing device, a smart phone, an Internet appliance or any other type of computing device. In another embodiment, processor 112 may be used in a system-on-a-chip (SoC) system.

One or more logical processors (e.g., execution threads) may operate on processing cores 120. TD 124A, 124N may operate on these execution threads. TDRM 122 may act as a full host and have full control over processing cores 120 and all logical processors operating on processing cores 120. TDRM 122 may assign software within TD 124A, 124N to execute on the logical processor associated with TD 124A, TD 124N. However, in embodiments of this disclosure, TDRM 122 may not access the execution state of TD 124A, 124N on the assigned logical processor(s) by the use of separate encryption keys. TDRM 122 may be prevented from accessing the execution state of TD 124A, 124N because it is outside of the TCB of TD 124A, 124N. Therefore, TDRM 122 may not be trusted to access the execution state, which could potentially provide information about the tenant workload to untrusted TDRM 122. Preventing TDRM 122 from accessing the execution state of TD 124A, 124N enforces integrity of the tenant workload executing on TD 124A, 124N.

Virtualization server 110 may further include memory 114 to store program binaries and other data. Memory 114 may refer to main memory, or may refer to both main memory and secondary memory, which may include read-only memory (ROM), hard disk drives (HDD), etc. TDRM 122 may allocate a specific portion of memory 114 for use by TD 124A, 124N, as TDPM 186A, 186N. TDPM 186A, 186N may be encrypted by a one-time cryptographic key generated by TDRM 122 when TD 124A, 124N is created. TDRM 122 may generate the one-time cryptographic key to encrypt TDPM 186A, 186N, but may not use the one-time cryptographic key to access contents stored within TDRM 186A, 186N.

TD 124A, 124N may use virtual memory addresses that are mapped to guest physical memory addresses, and guest physical memory addresses that are mapped to host/system physical memory addresses by memory controller 170. When TD 124A, 124N attempts to access a virtual memory address that corresponds to a physical memory address of a page loaded into memory 114, memory controller 170 may return the requested data through the use of an extended page table (EPT) 182 and a guest page table (GPT) 184. Memory controller 170 may include EPT walk logic and GPT walk logic to translate guest physical addresses to host physical addresses of main memory, and provide parameters for a protocol that allows processing core(s) 120 to read, walk, and interpret these mappings.

In one embodiment, tasks executed within TD 124A, 124N may not access memory 114 directly using the physical address of memory 114. Instead, these tasks access virtual memory of TD 124A, 124N through virtual addresses. The virtual addresses of virtual memory pages within the virtual memory may be mapped to the physical addresses of memory 114. The virtual memory of TD 124A, 124N may be divided into fixed sized units called virtual memory pages that each has a corresponding virtual address. Memory 114 may be organized according to physical memory pages (e.g., memory frames) that each have a fixed size. Each memory frame may be associated with an identifier that uniquely identifies the memory frame. A virtual memory page of the virtual address may be mapped corresponding to a fixed-sized unit in the physical address space of memory 114 (e.g., a memory frame, a physical memory page). During execution of a guest application (e.g., a VM) within TD 124A, 124N, responsive to a request to access memory 114, processor 112 may use mappings (e.g., mappings of virtual memory page to physical memory page in page tables such as GPT 184 of the guest application and EPT 182 of TDRM 122) to access physical memory pages of memory 114.

In one embodiment, TD 124A, 124N may be created and launched by TDRM 122. TDRM 122 may create TD 124A, for example, by executing a specific instruction (e.g., TDCREATE). TDRM 122 may select a 4 KB aligned region of physical memory 114 (corresponding to one memory page) and provide the address of the memory page as a parameter to the instruction to create TD 124A. The instruction executed by TDRM 122 may further cause processor 112 to generate a one-time cryptographic key (also referred to as an ephemeral key). The one-time cryptographic key may be assigned to an available HKID stored in KOT 140. KOT 140 may be a data structure, invisible to software operating on processor 112, for managing an inventory of HKIDs within the TD architecture. The available HKID may also be stored in TDCS 130A. KOT 140 and the use of HKIDs are described in further detail with respect to FIG. 1B. Processor 112 may consult with MOT 190, also described in further detail with respect to FIG. 1B, to allocate memory pages to TD 124A. MOT 190 may be a data structure, invisible to software operating on processor 112, used by processor 112 to enforce the assignment of physical memory pages to executing TDs. MOT 190 may allow TDRM 122 the ability to manage memory as a resource for each TD created (e.g., TD 124A, 124N), without having any visibility into data stored in the assigned TDPM.

Processor 112 may utilize a memory encryption engine 172 (e.g., MK-TME engine) to encrypt (and decrypt) memory accessed during execution of a guest process (e.g., an application or a VM) within TD 124A, 124N. As discussed above, TME allows memory accesses by software executing on a processing core (e.g., processing core(s) 120) to be encrypted using an encryption key. MK-TME is an enhancement to TME that allows the use of multiple encryption keys, thus allowing for compartmentalized encryption. In some embodiments, processor 112 may utilize encryption engine 172 to cause different pages to be encrypted using different encryption keys (e.g., one-time encryption keys). In various embodiments, encryption engine 172 may be utilized in the TD architecture described herein to support one or more encryption keys (e.g., ephemeral keys) generated for each TD 124A, 124N to help achieve cryptographic isolation between different tenant workloads. For example, when encryption engine 172 is used in the TD architecture, the CPU may enforce by default that all pages associated with each TD 124A, 124N are to be encrypted using a key specific to that TD.

Each TD 124A-12N may further choose specific TD pages to be plain text or encrypted using different encryption keys that are opaque to software executing on processor 112 (e.g., CSP-provided software). For example, memory pages within TDPM 186A, 186N may be encrypted using a combination of encryption keys which are unknown to TDRM 122, and a binding operation (e.g., an operation to map the TD's virtual addresses to corresponding physical addresses). The binding operation, executed by TDRM 122, may bind the memory pages within TDPM 186A, 186N to a particular TD by using a host physical address (HPA) of the page as a parameter to an encryption algorithm, that is utilized to encrypt the memory page. Therefore, if any memory page is moved to another location of memory 114, the memory page cannot be decrypted correctly even if the TD-specific encryption key is used.

In one embodiment, TD 124A, 124N may be destroyed by TDRM 122. TDRM 122 may cause TD 124A, for example, to stop executing on a logical processor associated with TD 124A by executing a specific instruction (e.g., TDSTOP). TDRM 122 may flush all cache entries of a cache 134, wherein cache 134 is associated with the logical processor executing TD 124A. Once all cache entries of cache 134 have been flushed, TDRM 122 may mark the HKID assigned to the one-time cryptographic key as available for assignment to other one-time cryptographic keys associated with other TDs (e.g., TD 124N). The TDRM 122 may then remove all pages from TDPM associated with TD 124A (e.g., TDPM 186A).

Computing system 100 is representative of processing systems based on the PENTIUM III™, PENTIUM 4™, Xeon™, Itanium, XSCALE™, or CORE™ available from Intel Corporation of Santa Clara, California, processors from Advanced Micro Devices, Inc., ARM processors, such as the ARM Cortex® family of processors, StrongARM™ devices, and/or other devices. In other embodiments, other systems (e.g., PCs having other microprocessing devices, engineering workstations, set-top boxes, etc.) may also be used. In one implementation, computing system 100 executes a version of the WINDOWS™ operating system available from Microsoft Corporation of Redmond, Washington, although other operating systems (e.g., UNIX, Linux, etc.), embedded software, and/or graphical user interfaces may also be used. Thus, implementations of this disclosure are not limited to any specific combination of hardware circuitry and software.

In an illustrative example, processing core(s) 120 may include processor logic and circuits (e.g., micro-architectures). Processing core(s) 120 with different micro-architectures may share at least a portion of a common instruction set. For example, similar register architectures may be implemented in different ways in different micro-architectures using various techniques, including dedicated physical registers, one or more dynamically allocated physical registers using a register renaming mechanism (e.g., the use of a register alias table (RAT), a reorder buffer (ROB), a retirement register file, etc.). One or more processing cores 120 may execute instructions of computing system 100. The instructions may include, but are not limited to, pre-fetch logic to fetch instructions, decode logic to decode the instructions, execution logic to execute instructions, and the like. Processor core(s) 120 may include a cache 134 to store instructions and/or data. Cache 134 may include, but is not limited to, a level one (L1) cache, a level two (L2) cache, and a last level cache (LLC). Cache 134 may also include any other configuration of the cache memory within processor 112.

Implementations of the present disclosure are not limited to desktop computing systems. Alternative implementations can be used in other devices, such as handheld devices and embedded applications. Some examples of handheld devices include cellular phones, Internet Protocol devices, digital cameras, personal digital assistants (PDAs), handheld PCs, etc. Embedded applications can include a micro controller, a digital signal processing device (DSP), a SoC, network computers (NetPC), set-top boxes, network hubs, wide area network (WAN) switches, or any other system that can perform one or more instructions in accordance with at least one specification.

One implementation may be described in the context of a single processing device desktop computer or server system, and by alternative implementations may be included in a multiprocessing device system. Computing system 100 may be an example of a "hub" system architecture. Computing system 100 may include a processor 112 to process data signals. Processor 112, as one illustrative example, may include a complex instruction set architecture (CISC) microprocessing device, a reduced instruction set architecture (RISC) microprocessing device, a very long instruction word (VLIW) microprocessing device, a processing device implementing a combination of instruction sets, or any other processing device, such as a digital signal processing device, for example. Processor 112 may be coupled to a processing device bus that transmits data signals between processor 112 and other components in computing system 100, such as main memory and/or secondary storage included in memory 114, storing instruction data, or any combination thereof. The other components of computing system 100 may include a graphics accelerator, a memory controller hub, an I/O controller hub, a wireless transceiver, a Flash BIOS, a network controller, an audio controller, a serial expansion port, an I/O controller, etc. These elements perform their conventional functions that are well known to those familiar with the art.

In one implementation, processor 112 may include a L1 internal cache memory as part of cache 134. Depending on the architecture, processor 112 may have a single internal cache or multiple levels of internal caches within cache 134. Other implementations include a combination of both internal and external caches depending on the particular implementation and needs. A register file may be used to store different types of data in various registers including integer registers, floating point registers, vector registers, banked registers, shadow registers, checkpoint registers, status registers, configuration registers, and instruction pointer register.

It should be noted that the execution unit may or may not have a floating point unit. Processor 112, in one implementation, includes a microcode (ucode) ROM to store microcode, which, when executed, is to perform algorithms for certain macroinstructions to handle complex scenarios. Here, microcode is potentially updatable to handle logic bugs/fixes for processor 112.

Alternate implementations of an execution unit may also be used in microcontrollers, embedded processing devices, graphics devices, DSPs, and other types of logic circuits. System 100 may include memory 114. Memory 114 may include a DRAM device, a static random access memory (SRAM) device, flash memory device, or other memory device. Main memory stores instructions and/or data represented by data signals that are to be executed by the processor 112. The processor 112 is coupled to the main memory via a processing device bus. A system logic chip, such as a memory controller hub (MCH) may be coupled to the processing device bus and memory 114. A MCH may provide a high bandwidth memory path to memory 114 for instruction and data storage of graphics commands, data and textures. The MCH can be used to direct data signals between processor 112, memory 114, and other components in the system 100 and to bridge the data signals between processing device bus, memory 114, and system I/O, for example. The MCH may be coupled to memory 114 through a memory interface. In some implementations, the system logic chip can provide a graphics port for coupling to a graphics controller through and Accelerated Graphics Port (AGP) interconnect.

The computing system 100 may also include an I/O controller hub (ICH). The ICH may provide direct connections to some I/O devices via a local I/O bus. The local I/O bus may be a high-speed I/O bus for connection peripherals to the memory 114, chipset, and processor 112. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can comprise a hard disk drive, a floppy disk drive, a CD-ROM device, a flash memory device, or other mass storage device.

For another implementation of a system, the instructions executed by the processing device core 120 described above can be used with a SoC. One implementation of a SoC comprises of a processing device and a memory. The memory for one such system is a flash memory. The flash memory can be located on the same die as the processing device and other system components. Additionally, other logic blocks, such as a memory controller or graphics controller, can also be located on a SoC.

Figure 1B:
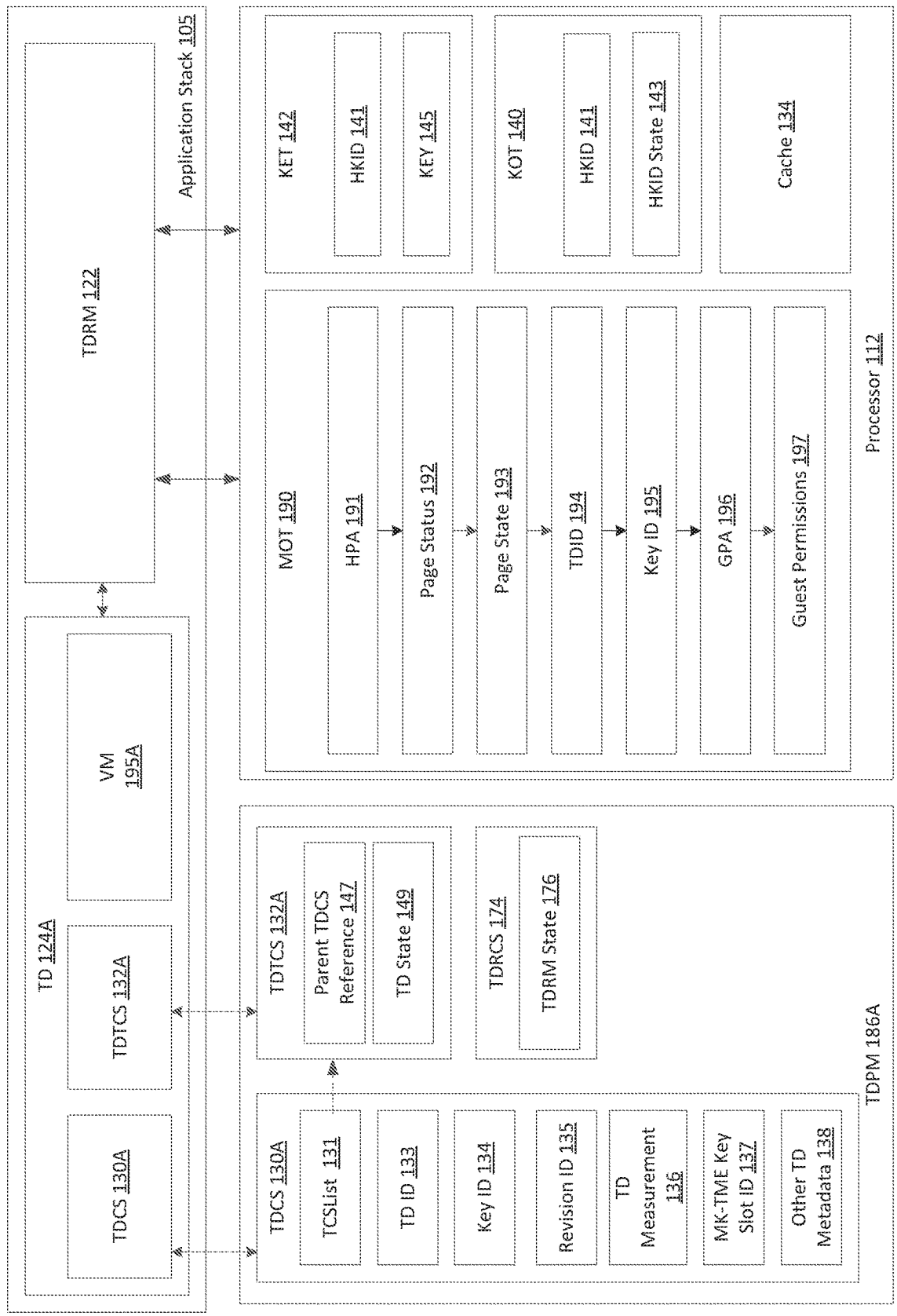
FIG. 1B illustrates a block diagram of another example computing system that provides isolation in virtualized systems using TDs, according to embodiments of the present disclosure.

FIG. 1B illustrates a block diagram of processor 112 of FIG. 1A, according to implementations of the disclosure. In one implementation, processor 112 may execute an application stack 105 via a single core 120 or across several cores 120. As discussed previously, processor 112 may provide a TD architecture and TDX to provide confidentiality and integrity for customer software running in in TDs (e.g., TD 124A, 124N) in an untrusted CSP infrastructure.

In one embodiment, TD architecture may provide ISA extensions (referred to as TDX) that support confidential operation of OS and OS-managed applications (virtualized and non-virtualized). A computing system, such as one including processor 112, with TDX enabled can function as multiple encrypted contexts referred to as TDs. For ease of explanation, a single TD 124A is depicted in FIG. 1B. Each TD 124A may run VMMs, VMs, OSes, and/or other applications. In FIG. 1B, TD 124A is depicted as hosting VM 195A.

In some implementations, TDRM 122 may be compatible with VMM 136. VMM 136 may refer to software, firmware, and/or hardware employed to create, run, and manage guest applications, such as VM 195A. VMM 136 may create and run VM 195A and allocate one or more virtual processors (e.g., vCPUs) to VM 195A. VM 195A may be referred to as guest 195A herein. VMM 136 may allow VM 195A to access hardware of the underlying computing system, such as computing system 100 of FIG. 1A. VM 195A may execute a guest OS, and VMM 136 may manage the execution of the guest OS. The guest OS may function to control access of virtual processors of VM 195A to underlying hardware and software resources of computing system 100. It should be noted that, when there are numerous VMs operating on the processing device 112, VMM 136 may manage each of the guest OSes executing on the numerous guests. In some implementations, the VMM may be implemented with TD 124A to manage VM 195A. VMM 136 may be referred to as a tenant VMM and/or a non-root VMM.

In one embodiment, TDRM may initialize a trust domain virtual machine control structure (TDVMCS) and activate it as a working virtual machine control structure (VMCS) in accordance with a virtualization architecture and ISA extensions (e.g., VMX). Similar to TDCS 130A, a VMCS may be a data structure saved in memory that is managed by the VMM. The VMCS may store the host and guest state information needed for virtualizing a VM's logical processor, while the TDCS may store control information specific to TDX, as discussed in more detail with reference to Table 1 below. The TDVMCS may store the host and guest state information needed for executing a TD, such as TD 124A. The TDVMCS may be used as a VMCS for VM 195A and the VMM operating within TD 124A.

MOT 190 may be a structure invisible to any software that is managed by processor 112 to enforce assignment of physical memory pages to executing TDs, such as TD 124A. Processor 112 may use MOT 160 to enforce that software operating as a tenant TD 124A or TDRM 122 cannot access memory associated with a physical address unless explicitly assigned to it. To accomplish this, MOT 190 may enforce that software outside TD 124A, including TDRM 122, cannot access any memory belonging to a different TD (e.g., TD 124N of FIG. 1A). MOT 190 may also enforce that memory pages assigned by MOT 190 to specific TDs, such as TD 124A, should be accessible from any processor in the system (where the processor is executing the TD that the memory is assigned to). In one implementation, MOT 190 may enforce memory access control during the page walk for memory accesses made by software. Physical memory accesses performed by processor 112 that is not assigned to TD 124A or TDRM 122 may fail.

MOT 190 may be used to hold meta-data attributes (e.g., security attributes) for each 4 KB page of memory. For example, MOT 190 may hold attributes including: page status (e.g., whether a page is valid in memory or not); page category (e.g., DRAM, NVRAM, I/O, Reserved); page state (e.g., indicating whether the page is assigned to another TD (e.g., TD 124N of FIG. 1A) or TDRM 122, free for assignment, blocked from assignment, or pending); and TDID (e.g., an identifier that assigns the page to a specific unique TD). Additional structures may be defined for additional page sizes (e.g., 2 MB, 1 GB, etc.). In other implementations, other page sizes may be supported by a hierarchical page structure (e.g., a page table). A 4 KB page reference in MOT 190 may belong to one running instance of TD 124A. The 4 KB page reference may also be a valid memory or marked as invalid. In one implementation, each TD 124A instance may include one page holding a TDCS 130A for that TD 124A.

KOT 140 may be a data structure, e.g. a table, for managing an inventory of HKIDs within the TD architecture. Similar to MOT 190, KOT 140 may not be visible to software operating on processor 112. KOT 140 may be used to assign a HKID to a one-time cryptographic key generated for TD 124A. In one embodiment, multiple one-time cryptographic keys may be generated for TD 124A. In a further embodiment, a different HKID may be assigned to each one-time cryptographic key generated for TD 124A. KOT 140 may further be used by TDRM 122 to revoke HKIDs assigned to one-time cryptographic keys and control flushing cache 134 upon TD destruction, in accordance with embodiments described herein.

KOT 140 may keep track of all HKIDs available for use by all TDs executing on a computing system in accordance with the TDX architecture. A HKID may have a state of assigned, free (or available), reclaimed, or configured. A HKID that has a free state is available for assignment to cryptographic keys (e.g., one-time cryptographic key generated for TD 124A). A HKID that has an assigned state is assigned to a cryptographic key associated with a TD and, therefore, is not available for assignment to subsequent cryptographic keys. A HKID that has a configured state has been configured, along with its assigned cryptographic key, in an encryption engine (e.g., encryption engine 172 of FIG. 1A). An HKID is given a reclaimed state during the process of destroying TD 124A, described in further detail in reference to FIG. 9. A HKID may have a reclaimed state until all cache entries of cache 134 have been flushed. When all cache entries have been flushed, the state of HKID may be changed from reclaimed to available.

KET 142 may be a data structure, invisible to software executing on processor 112, for configuring an encryption engine (e.g., encryption engine 172 of FIG. 1A). KET 142 may be indexed by HKID and may indicate whether each HKID has been configured in the encryption engine.

TDCS 130A may be assigned to TD 124A and stored in TDPM 186A. TDCS 130A may be an access-control structure that is part of the TD architecture and is managed by TDRM 122. TDCS 130A may manage transitions into and out of TDX operation (e.g., TD entries and TD exits). Transitions from TDRM 122 into TDX tenant operation are called TD entries. TD entries may be triggered by an instruction executed by TDRM 122. Transitions from TDX tenant operation to TDRM 122 are called TD exits. TD exits may be triggered by a hardware event requiring an exit from TD 124A. For example, a page fault in a page table supporting the TD (e.g., EPT 182 of FIG. 1A) may cause a TD exit.

TDCS 130A may occupy a 4 KB naturally aligned region of memory 114 (e.g., a page of memory). TDCS 130A may include, but is not limited to, the following fields depicted below in Table 1:

TABLE 1

TDX Control Information Stored in TDCS

| Field | Size (bytes) | Description |
| --- | --- | --- |
| REVISION | 4 | Revision Identifier |
| TDID | 8 (40 bits valid, rest reserved) | TD Identifier |
| COUNT-TCS | 4 (16 bits valid, rest reserved) | Number of TDTCSs associated with this TDCS |
| COUNT_BUSY_TCS | 4 (16 bits valid, rest reserved) | Number of busy TDTCSs associated with this TDS |
| KID_ENTRY_0* | 8 (8 bits valid, rest reserved) | Ephemeral Key ID for one-time cryptographic key assigned to TD during TDCREATE |
| ATTRIBUTES | 16 (see Table 2 below) | Attributes of TD |
| MRTD | 48 | SHA-384 measurement 138 of the initial contents of the TD |
| RESERVED | 16 (must be zero) | Reserved for MREG growth to SHA 512 |
| MRSWID | 48 | Software defined identifier for additional logic loaded after initial builds |
| MRCONFIGID | 48 | Software defined identifier for additional TD SW configuration |
| MROWNER | 48 | Software defined identifier for VM's owner |

TABLE 1-continued

TDX Control Information Stored in TDCS

| Field | Size (bytes) | Description |
| --- | --- | --- |
| MROWNERCONFIG | 48 | Software defined identifier for additional image configuration from owner |
| XCR0 | 8 | Initial values of XCR0 |
| OWNERID | 8 | Owner ID |
| MRTDBLOCKS | 4 | Number of blocks updated into MRTD (only needed pre-TDINIT) |
| COUNT_TCS_MAX | | Max value specifies maximum number of logical processors that may be assigned to this TD (max. possible is 4095) |
| RESERVED | | Reserved (other TD metadata) |

In one embodiment, multiple logical processors may be assigned to TD 124A. For each logical processor assigned to TD 124A, a trust domain thread control structure (TDTCS) 132A page may be added to TDPM 186A. In one embodiment, multiple TDTCS 132A pages may be added to TDPM 186A. TDTCS 132A may be used to enter into TD 124A or exit from TD 124A, in accordance with embodiments discussed below. TDTCS 132A may include a state save area (SSA) to store the execution state for one logical processor assigned to TD 124A. If a TD exit condition occurs when processor 112 is executing an instruction associated with a memory page of TDPM 186A (i.e., the processor is operating in tenant mode), a TDEXIT instruction may be executed by TDRM 122. The state of TD 124A may be saved in TDTCS 132A. In another embodiment, if a TD exit condition occurs when processor 112 is operating in the context of a non-root VMM inside TD 124A, TDRM 122 may execute a VMEXIT instruction to the TD VMM. The tenant VMM state may be saved in TDTCS 132A and TDRM 122 may subsequently perform a TD exit.

As discussed above, TDTCS 132A may hold the execution state of TD 124A in the SSA. The execution state of TD 124A may include the execution state of the logical processor executing TD 124A, a link back to a parent TDCS (e.g., TDCS 130A), a plurality of TDTCS execution flags, a TD state corresponding to a supervisor mode, and a TD state corresponding to a user.

In one embodiment, TDCS 130A and TDTCS 132A may be access controlled by MOT 160 (e.g., an encryption key ID stored in MOT 190 may be used to enforce memory access controls). In another implementation, TDCS 130A and TDTCS may be access-controlled via storage in a restricted range register(s), such as range registers 160 illustrated in FIG. 1A, of processor 112 that is inaccessible to software accesses.

TDRM 122 state area may be stored in a TDRM control structure (TDRCS) 174. TDRCS 174 may also be implemented as a new type of VM control structure that only contains a host state, controls, and TD exit info.

Figure 2:
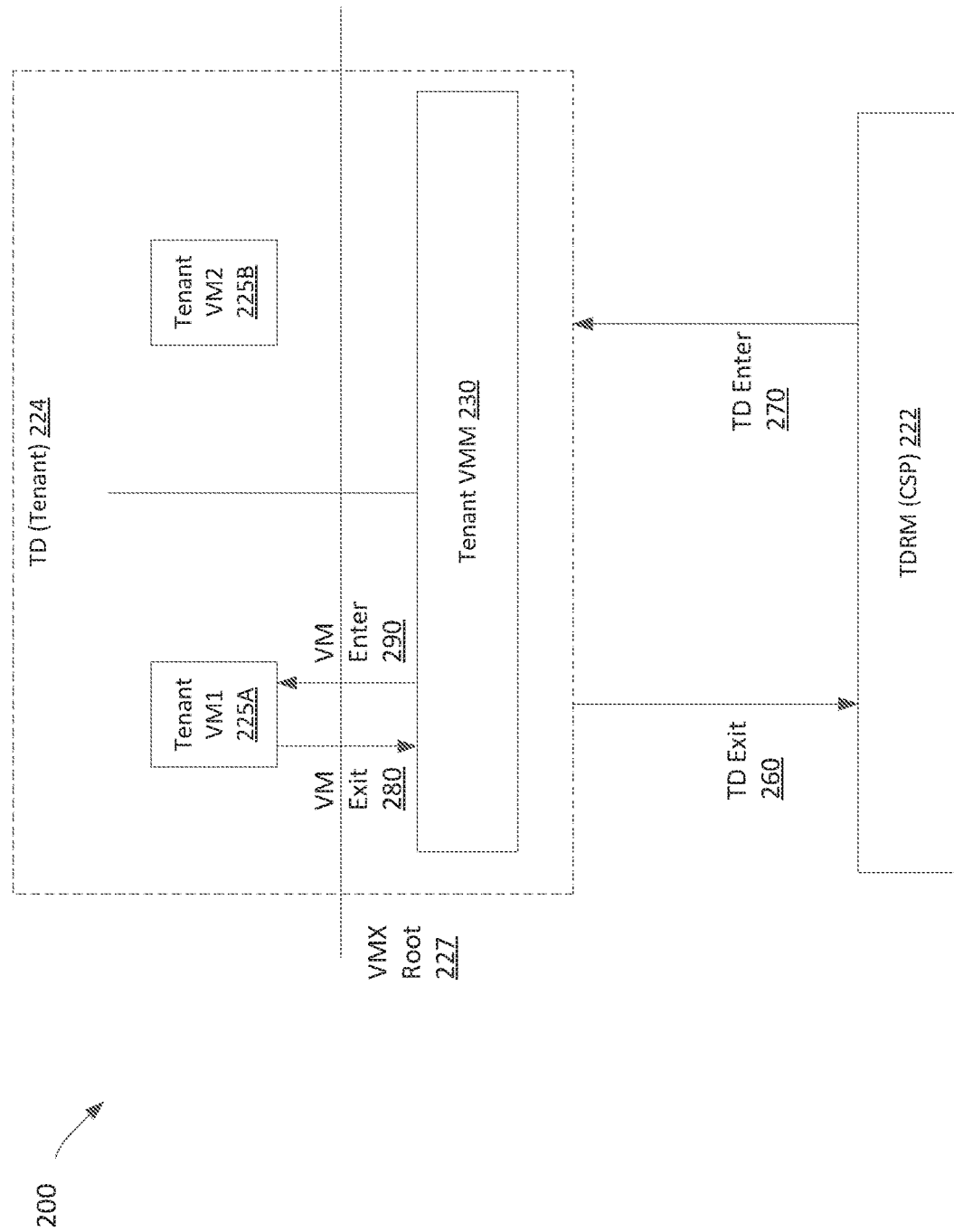
FIG. 2 is a block diagram of an example of a TD architecture, according to embodiments of the present disclosure.

FIG. 2 illustrates a block diagram of an example TD lifecycle 200 and the interactions between TD 224 and TDRM 222. In one implementation, TD 224 and TDRM 222 may be the same as their counterparts described with respect to FIGS. 1A and 1B. The TD architecture 200 may be the same as a TD architecture provided by computing device 100 of FIGS. 1A and 1B. TD architecture 200 may provide a layer that manages lifecycle of TDs active on a system. Processor support for TDs may be provided by a processor operation called a TDX operation. There are two types of TDX operations: resource manager operation and tenant operation. In general, TDRM 222 runs in TDX resource manager operation, and TDs, such as TD 224, run in TDX tenant operation. Transitions between resource-manager operation and tenant operation are referred to as TDX transitions.

There are two types of TDX transitions: TD entry 270 and TD exit 260. Transitions from TDX resource manager operation into TDX tenant operation are called TD entries 270. TD entries may be triggered by an instruction executed by TDRM 222. Transitions from TDX tenant operation to TDX resource manager operation are called TD exits 260. TD exits 260 may be triggered by a hardware event requiring an exit from the TD. For example, a page fault in a page table supporting the TD (e.g., EPT 182 of FIG. 1A) may cause a TD exit 206.

As discussed above, processing in TDX resource manager operation behaves similarly as it does outside of TDX operation. The principal differences are that a set of TDX operations (TDX instructions) is available and that values that can be loaded into certain control registers are limited to restrict the modes and abilities of TDRM 222.

Processor behavior in TDX tenant operation is restricted to fabricate isolation. For example, instead of ordinary operation, certain events (e.g., page fault, unauthorized access to memory pages, task switching, tenant workload termination, etc.) cause TD exits 260 to the TDRM 180. These TD exits 260 do not allow TDRM 222 to modify the behavior or state of TD 224. TDRM 222 may use platform capabilities to retain control of platform resources. Software running in TD 224 (e.g., Tenant VM1 225A, Tenant VM2 225B, etc.) may use software-visible information to determine it is running in a TD 224, and may enforce local measurement policies on additional software loaded into TD 224. However, validating the security state of TD 224 is a process performed by a remote attestation party to ensure confidentiality.

TD architecture 200 may be designed to minimize compatibility problems on software that relies on virtualization when running in a TD 224. TD architecture 200 leaves most interactions between VM 225A, 225B running in tenant operation and tenant VMM 230 running in tenant operation unchanged. If there is no VMM 230 present in TD 224, a VM OS (not shown) may be modified to work with TDRM 222 as the root VMM.

In one implementation, TDRM 222 may explicitly decide to cause a TD exit 260, for example, to terminate a TD 224 or to manage memory resources (e.g., yield assigned memory resource, request free memory resources, etc.). TD architecture 200 may also provide TDRM 222 with the ability to force TD exits 260 for preemption. On TD exits 260, TD architecture enforces that the execution state of TD 224 may be saved in a CPU access-controlled memory structure (e.g., TDTCS 132A of FIGS. 1A and 1B) allocated to the TD 224 and encrypted using a unique encryption key (e.g., a one-time encryption key) associated with TD 224 that is not visible to TDRM 222 or other TDs to protect confidentiality of TD state from the TDRM 222 or other TDs. The TD execution state may similarly be protected against spoofing (e.g., a person or program successfully masquerading as another by falsifying data), remapping (e.g., remapping the physical memory of a protected virtual address to a new virtual address within the context of a malicious module), and/or replay via integrity controls (e.g., a valid data transmission is maliciously or fraudulently repeated or delayed) on memory.

TD enter 270 is a complementary event to TD exit 260. For example, TD enter 270 may occur when TDRM 222 schedules a TD 224 to run on a logical processor and transfers execution to the software running in the TD 224. During TD enter 270, TD architecture 200 may enforce that the execution state of TDRM 222 is saved in a memory owed by TDRM (i.e., TDPM 186A, 186N of FIGS. 1A and 1B), which is encrypted using a unique encryption key (e.g., one-time encryption key) assigned for sole use by the TDRM 222.

TDs, such as TD 224, may be setup by TDRM 222 using specific instructions (e.g., TDCREATE, TDADDPAGE, etc.) to cause memory space to be allocated to the TD and to be encrypted using a unique encryption key that is not visible to TDRM 222 or other software. Before executing any instructions belonging to TD 224 on a logical processor, all TD memory stored in TDPM (e.g., TDPM 186A, 186N of FIGS. 1A and 1B) may be encrypted using a unique key associated with TD 224 (e.g., a one-time cryptographic key). Although specific instruction names are referenced herein, other names for the instructions may be utilized in implementations of the disclosure and are not limited to the specific names provided herein.

In one implementation, TDRM 222 may launch each TD 224 with a small software image (similar to IBB or initial boot block) after signature verification and record the IBB measurement (for subsequent attestation) using a platform root of trust. The measurement may be obtained for the small software image to prevent the instructions used to launch TD 224 from being used again. The measurement may be computed using a secure hashing algorithm so the system software can only implement a TD that matches an expected measurement by following the exact sequence of instructions executed by TDRM 222. The TDX design may use a 256-bit SHA-2 secure hash function to compute the measurements. The IBB software executing in TD 224 may be responsible for completing the measured launch of TD 224 and requesting additional resources from TDRM 222. In one embodiment, TD 224 may use a single encryption key to protect the entire TDPM. In another embodiment, TD 224 may use multiple encryption keys to protect the TDPM, wherein each encryption key may be associated with different tenant VMs 225A, 225B, and/or containers or different memory resources such as NVRAM. Thus, when TD 224 is first created, TD 224 may use an exclusive CPU-generated MK-TME key. Thereafter, TD 224 may optionally set up additional MK-TME encryption keys for each tenant software-managed context that operates inside the TD 224, as discussed above.

In order to minimize software compatibility impact on VMMs for CSP (e.g., TDRM 222 and tenant VMM 230), a virtualization operation (e.g., VMX) may remain unmodified inside a TD 224 in TD architecture 200. Similarly, operation of VMM software, such as EPT and GPT management, can remain under the control of the tenant VMM 230 (if one is active in the TD 224 and is not managed by the TDRM 222). As the TDRM 222 assigns physical memory for each TD 224, TD architecture 200 includes the MOT, described with respect to FIGS. 1A and 1B. Processor 112 may consult TDRM-managed MOT 190 to allocate portions of memory 114 to TDs (e.g., TD 224). This may allow TDRM 222 the full ability to manage memory as a resource without having any visibility into data resident in assigned TD memory. In some implementations, as discussed above, the platform (e.g., root) VMM and TDRM 222 may be in the same encryption key domain, thus sharing the memory management and scheduler functions (but still remaining outside the tenant's TCB).

Figure 3:
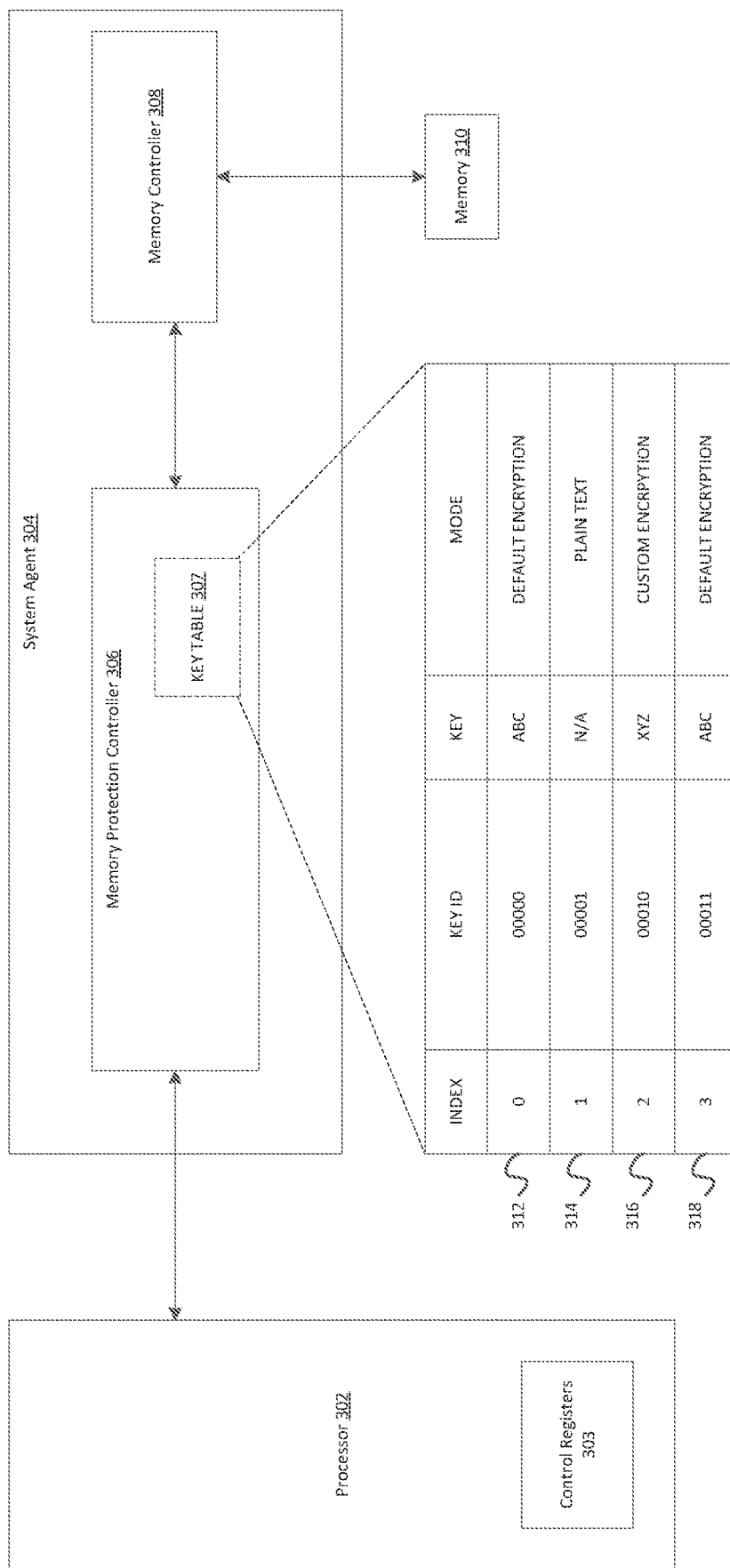
FIG. 3 illustrates a block diagram of another example of a TD architecture, according to embodiments of the present disclosure.

FIG. 3 illustrates an example embodiment of a multi-key total memory encryption (MK-TME) engine. The MK-TME engine may be used as an encryption engine, in accordance with embodiments of this disclosure. In the illustrated embodiment, memory protection system 300 includes processor 302, system agent 304, and memory 310. Memory protection system 300 may provide cryptographic protection of data stored on memory 310. Processor 302 may correspond with processor 112, illustrated in FIGS. 1A and 1B. Memory 310 may correspond with memory 114, also illustrated in FIGS. 1A and 1B. System agent 304, while not illustrated in FIGS. 1A and 1B, may be a component of virtualization server 110. Specifically, system agent 304 may be a component of processor 112, and memory controller 308 may correspond with memory controller 170 of FIGS. 1A and 1B.

System agent 304 may be used to provide various functions for processor 302, such as managing access to memory 310 and/or other resources of system 300. In the illustrated embodiment, for example, system agent 304 may include a memory controller 308 to control and/or manage access to memory 310 of system 300. Moreover, as described further below, system agent 304 may also include a memory protection controller 306 to protect data stored on memory 310. In some embodiments, system agent 304 may also provide an interface between processor 302 and other components of system 300 (e.g., using a direct media interface (DMI) and/or PCI-Express bridge). In various embodiments, system agent 304 may include any combination of logic elements configured to perform functionality of system agent 304 described herein, whether loaded form memory or other non-transitory computer readable medium, or implemented directly in hardware, including by way of non-limiting examples: a microprocessor, digital signal processor (DSP), field-programmable gate array (FPGA), graphics processing unit (GPU), programmable logic array (PLA), application-specific integrated circuit (ASIC), and/or VM processor. System agent 304 may be integrated with processor 302, or alternatively, system agent 304 may be implemented on a separate chip communicatively coupled or connected to processor 302.

Memory controller 308 may be used to control and/or manage access to memory 310 of system 300. In various embodiments, memory controller 308 may be implemented using any combination of hardware and/or software logic, including a microprocessor, ASIC, FPGA, PLA, VM, and/or any other type of circuitry or logic.

In the illustrated embodiment, system 300 provides cryptographic memory protection for memory 310. In some embodiments, for example, cryptographic memory protection may be implemented by extending and/or modifying a particular computer architecture. For example, cryptographic memory protection may be implemented by extending the functionality of a processor 302 and/or introducing a memory protection controller 306. In the illustrated embodiment, for example, processor 302 is extended to support control registers 303 and processor instruction(s) that can be used to enable and/or configure cryptographic memory protection, and memory protection controller 306 is implemented to provide the cryptographic memory protection. Control registers 303 may correspond to range registers 160 illustrated in FIG. 1A. Although the illustrated example uses separate logical blocks to depict memory protection controller 306 and processor 302, in actual embodiments, memory protection controller 306 and processor 302 may be integrated together or alternatively may be implemented as separate components. In various embodiments, for example, memory protection controller 306 may be implemented using any combination of hardware and/or software logic, including a microprocessor, ASIC, FPGA, PLA, VM, and/or any other type of circuitry or logic.

Memory protection controller 306 may use memory encryption to protect data stored on memory 310. In some embodiments, for example, memory protection controller 306 may be implemented on the memory path or memory bus to allow encryption of data transmitted to and from, and/or stored on, memory 310. Moreover, in some embodiments, memory protection controller 306 may be configurable or programmable, and may include support for multiple encryption keys. Accordingly, memory protection controller 306 may be configured or programmed (e.g., by software) to encrypt different regions or pages of memory 310 using different encryption keys and/or algorithms. In this manner, memory encryption can be provided and configured separately for different users, tenants, customers, applications, and/or workloads.

For example, in some embodiments, memory protection controller 306 may be used to define various secured or protected domains that can be separately configured and protected using memory encryption. In some embodiments, for example, a "domain" may be viewed as a collection of resources associated with a particular workload (e.g., a TD), and may include any regions of memory containing data associated with the workload. For example, a TD for a customer workload of a CSP may include resources (e.g., memory) associated with an OS, VM (e.g., a VM running on a VMM executed by a TDRM), and/or any ring-3 applications running on the OS or VM. Memory protection controller 306 may allow the protected domains to be configured and protected separately, thus allowing each protected domain to be cryptographically isolated in memory by encrypting its associated code and/or data with a unique encryption key. In this manner, the workloads of different users, customers, and/or tenants can be cryptographically isolated by defining different protection domains for the various workloads.

In some embodiments, the cryptographic memory protection of system 300 may be discovered and configured using processor instructions and/or hardware registers. For example, in some embodiments, a processor instruction may be used to determine whether cryptographic memory protection is supported by system 300, such as a CPU identification (CPUID) instruction used by software to identify the capabilities of a particular processor.

Upon determining that cryptographic memory protection is supported by system 300, the cryptographic memory protection may then be enabled and/or configured using hardware registers, such as control registers 303 of processor 302. For example, control registers 303 may include various model-specific registers (MSRs) that allow software to discover, enable, and/or configure the cryptographic memory protection capabilities of system 300. In some embodiments, for example, control registers 303 may include a memory encryption capability register, a memory encryption activation register, and/or one or more memory encryption exclusion registers.

In the illustrated embodiment, memory protection controller 306 maintains an internal domain key table 307 to identify protected domains (e.g., TDs) that have been configured in system 300. Key table 307 may be implemented using any form of memory or storage (e.g., RAM), and may also be implemented directly on memory protection controller 306, in memory 310, and/or using another memory component.

Entries 312-318 of domain key table 307 each correspond to a different protected domain (e.g., a TD). For example, each entry 312-318 may include a key or domain ID, a protection mode, and an associated encryption key (e.g., a one-time cryptographic key). In some embodiments, for example, a key ID (e.g., a HKID) may represent the higher order bits of the memory addresses that are within the associated protected domain. In the illustrated example, each key ID in domain key table 307 is represented using 5 bits. Accordingly, the protected domain associated with a given key ID covers all memory addresses whose highest order 5 bits match the key ID. In the illustrated embodiment, the key ID may be stored as a field in key table 307, but in alternative embodiments, the key ID may be used as an index into key table 307 rather than being stored directly in key table 307.

Moreover, in some embodiments, multiple protection modes may be supported, and each protected domain may be protected using a particular protection mode. For example, in some embodiments, the standard protection modes may include plaintext mode (e.g., unencrypted), standard or default encryption mode (e.g., encrypted using a standard or default encryption key), and/or custom encryption mode (e.g., encrypted using a unique encryption key). Accordingly, key table 307 may identify the protection mode associated with each protected domain or key ID.

In the illustrated example, domain key table 307 includes four entries. The first entry identifies a protected domain corresponding to key ID 00000 (thus covering all memory addresses that contain 00000 in the highest order of 5 bits), which is protected in default encryption mode using key "ABC." The second entry identifies a protected domain corresponding to key ID 00001 (this covering all memory addresses that contain 00001 in the highest order 5 bits), which is protected in plaintext mode and this does not have an associated encryption key. The third entry identifies a protected domain corresponding to key ID 00010 (thus covering all memory addresses that contain 00010 in the highest order 5 bits), which is protected in custom execution mode using key "XYZ." The fourth entry identifies a protected domain corresponding to key ID 00011 (thus covering all memory addresses that contain 00011 in the highest order 5 bits), which is protected in default encryption mode using key "ABC." As shown by these examples, the domain protected using custom encryption mode has a unique key ("XYZ"), the domains protected using default encryption mode share an encryption key ("ABC"), and the domain protected in plaintext mode is unencrypted and thus has not associated key. In embodiments of this disclosure, TDs may be protected under custom encryption mode and have a unique key (e.g., a one-time cryptographic key).

In some embodiments, protected domains may be defined and/or configured using a processor instruction implemented by processor 302 (e.g., PCONFIG). This processor instruction may be used to define and/or configure a protected domain by programming a new entry—or modifying an existing entry—in key table 307 of memory protection controller 306. In this manner, protected domains (e.g., TDs) may be defined and configured programmatically (e.g., by management software) using the processor instruction.

Figure 9:
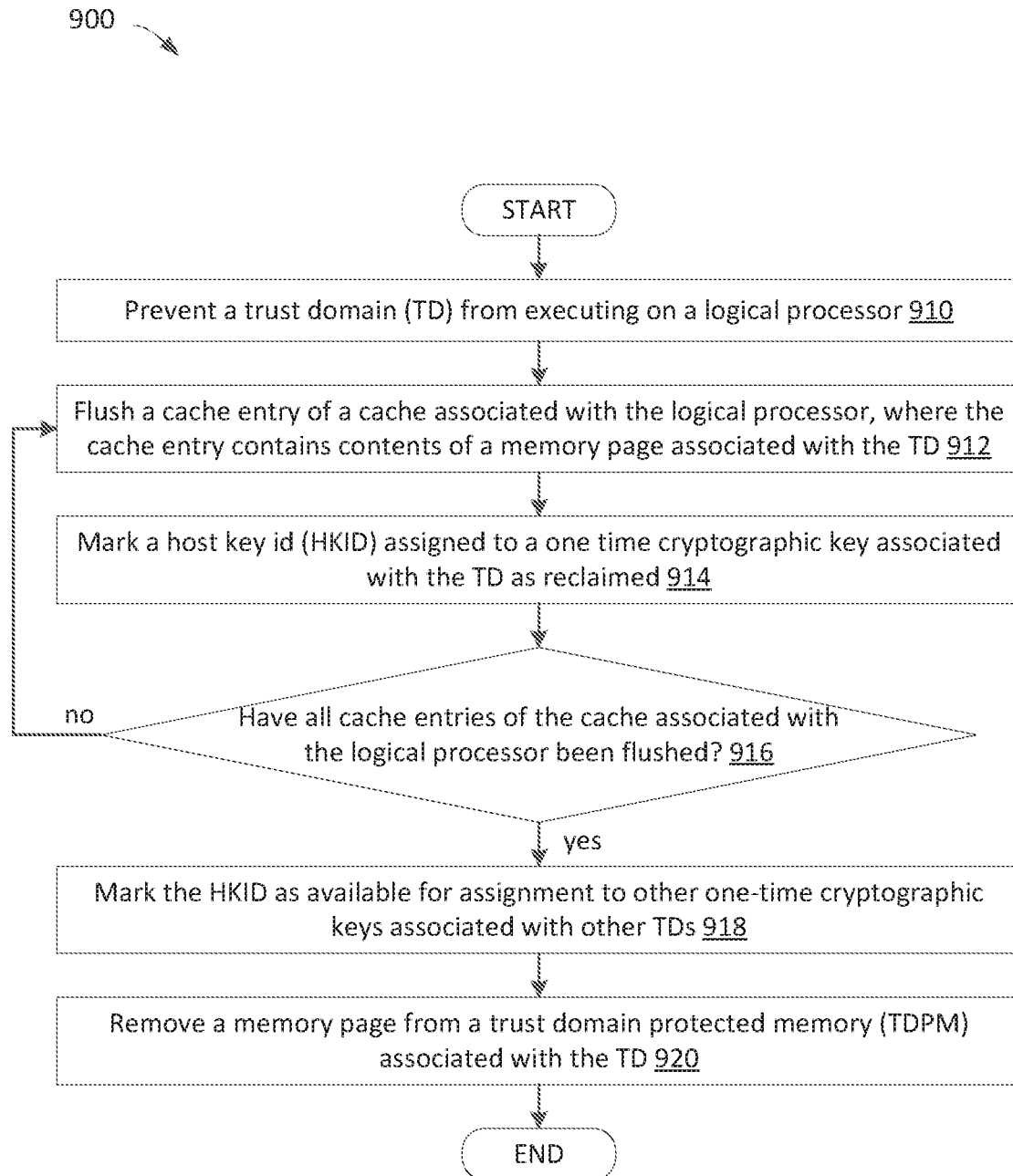
FIG. 9 illustrates a flow diagram for a method of destroying a TD, according to embodiments of the present disclosure.
Figure 10:
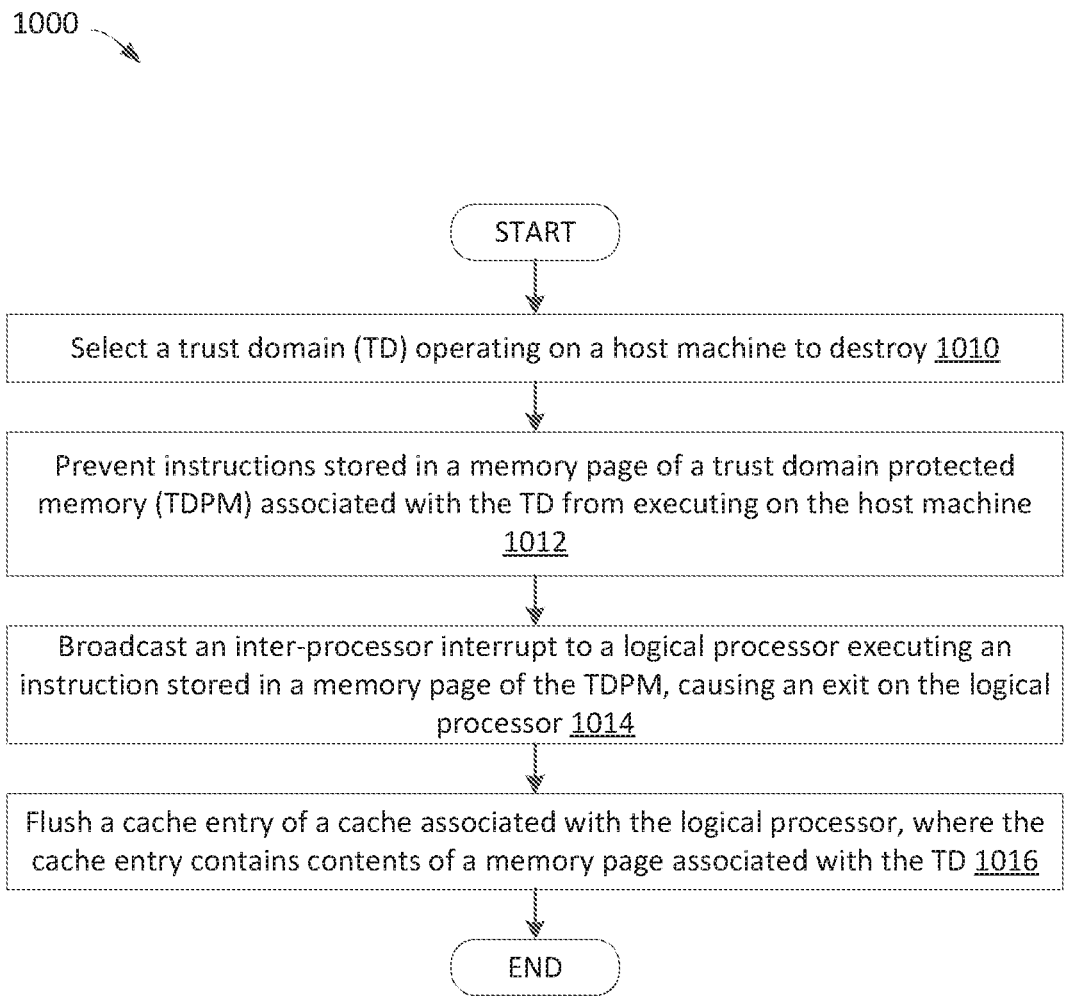
FIG. 10 illustrates a flow diagram for a method of preventing a TD from executing on a logical processor, according to embodiments of the present disclosure.
Figure 11:
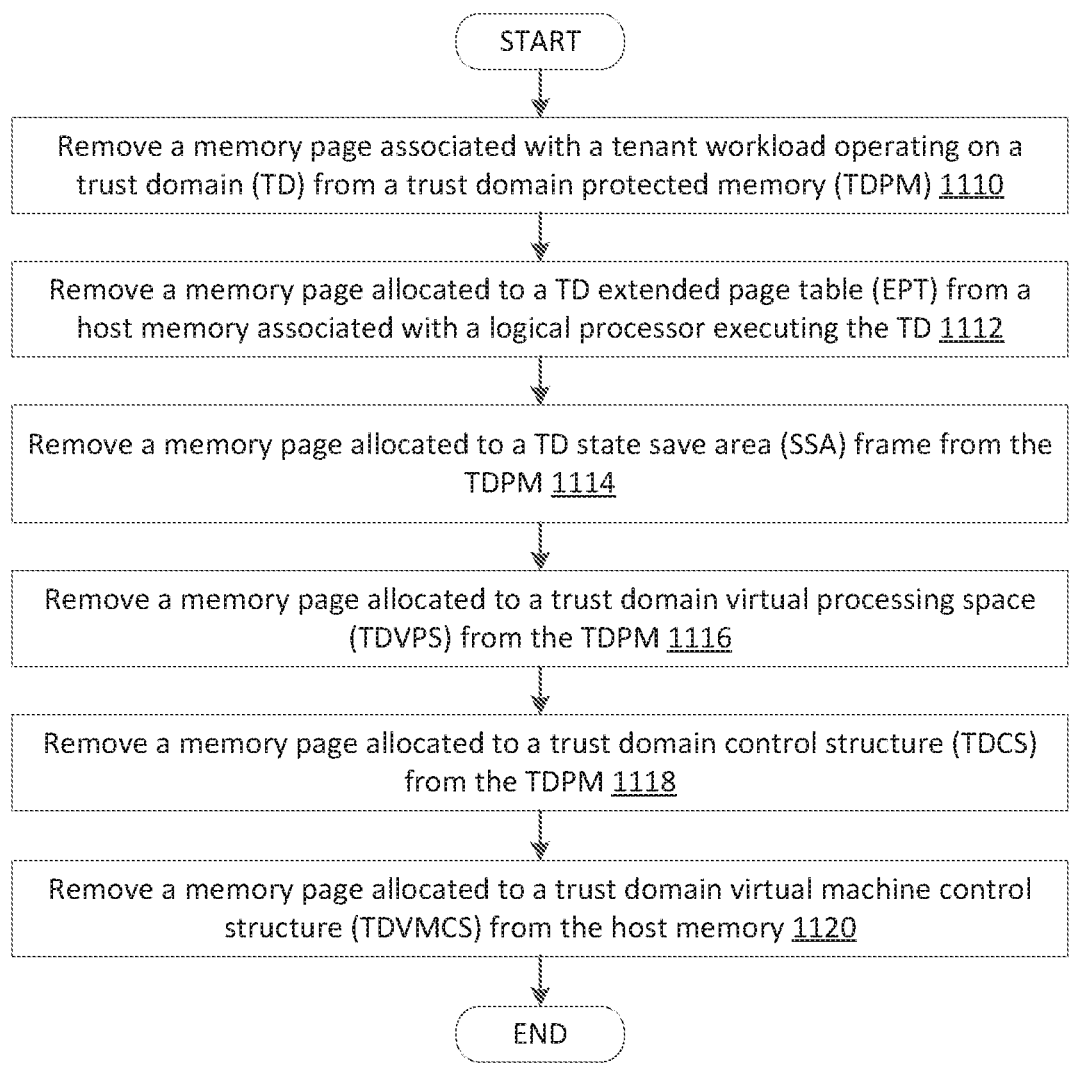
FIG. 11 illustrates a flow diagram for a method for removing a memory page from a TDPM associated with a TD, according to embodiments of the present disclosure.

FIGS. 4-8 are flow diagram methods 400, 500, 600, 700, and 800 of creating a TD, by a TDRM, in accordance with certain embodiments described herein. FIGS. 9-11 are flow diagram methods 900, 1000, and 1100 for destroying a TD, by a TDRM, in accordance with certain embodiments described herein. Methods 400-1100 may be performed by a processing logic that is hardware (e.g., circuitry, dedicated logic, programmable logic, microcode, etc.). In one embodiment, methods 400-1100 may be performed, in part, by processor 112 of FIGS. 1A and 1B executing TDRM 122. For example, methods 400-1100 may be performed by logic circuitry of processor 112 including one or more of processing core(s) 120, cache 134, MOT 190 [ ], KOT 140, KET 142, WBT 144, KMT 146, range registers 160, memory controller 170, encryption engine 172, and I/O ports 150.

For simplicity of explanation, methods 400-1100 are depicted and described as acts. However, acts in accordance with this disclosure can occur in various orders and/or concurrently and with other acts not presented and described here. Furthermore, not all illustrated acts may be performed to implement the methods 400-1100 in accordance with the disclosed subject matter. In addition, those skilled in the art will understand and appreciate that methods 400, 500, 600, 700, 800, 900, 1000, and 1100 could alternatively be represented as interrelated states via a state diagram or events.

Figure 4:
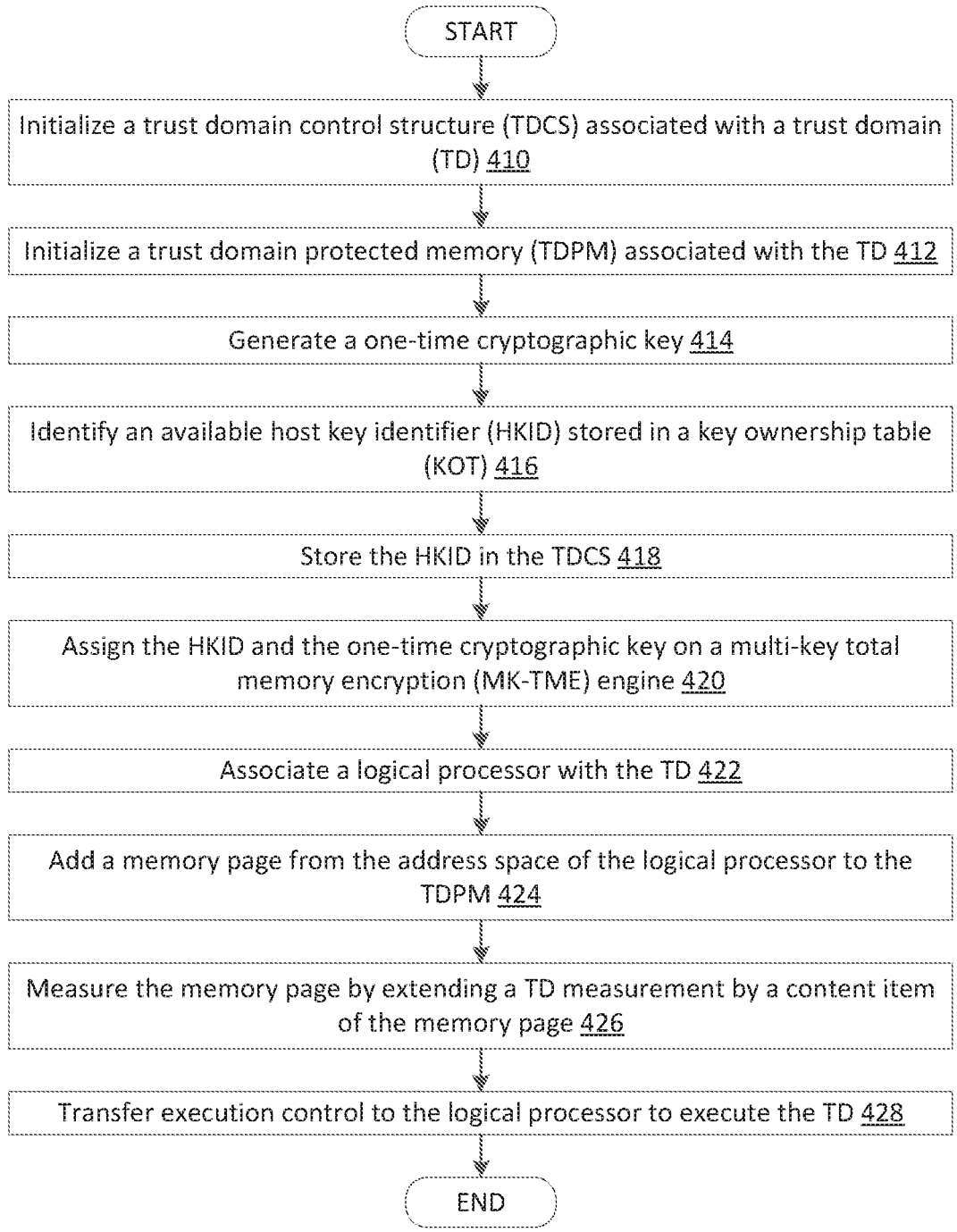
FIG. 4 illustrates a flow diagram of a method for creating a TD, according to embodiments of the present disclosure.

FIG. 4 illustrates a flow diagram of a method 400 for creating a TD. As discussed previously, a TD may be created and launched by the TDRM. The TDRM may act as a host and have control of the processor and platform hardware. The TDRM may create a TD by executing a specific instruction (e.g., TDCREATE), which may initiate the TD creation process.

At block 410, the TDRM may initialize a TDCS. As discussed above, the TDCS is an access-control structure that is part of TDX ISA and managed by the TDRM. The TDCS, however, cannot be directly accessed by the TDRM. The TDCS may occupy a 4 KB naturally aligned region of memory (e.g., a page of memory). The page occupied by the TDCS in a MOT (e.g., MOT 190 illustrated in FIGS. 1A and 1B) may be blocked against software reads/writes after the TDCREATE instruction is successfully executed. The TDRM may initialize the TDCS in accordance with embodiments described with respect to FIG. 5 below.

At block 412, the TDRM may initialize a TD protected memory (TDPM). The TDPM may be a portion of physical memory to be associated with a TD. The TDRM may select a portion of physical memory available to be associated with a TD and then initialize the portion of physical memory as the TDPM, in accordance with embodiment described with respect to FIG. 5 below.

In one embodiment, the TDRM may allocate a target page for the TDCS in the TDPM. The TDRM may select a region of physical memory (e.g., an aligned 4 KB region) and provide this as a parameter to the instruction to create the TD (e.g., TDCREATE). This region of memory may be allocated for the TDCS. In some embodiments, the region of memory allocated for the TDCS may be blocked against read and writes operations, and is therefore protected within the TDX architecture. The TDCS, for example, may hold a TD identifier, the encryption key allocated to the TD, and a HKID associated with the encryption key.

At block 414, the TDRM may cause a one-time cryptographic key to be generated to be used to encrypt memory pages include in the TDPM. The one-time cryptographic key may be an ephemeral key (i.e., a cryptographic key that is generated for each TD created by the TDRM). TDRM may select a key programming mode for programming the one-time cryptographic key for the TD. For example, the TDRM may directly specify a key for the domain. In accordance with TD architecture described herein, TDRM may, in other examples, request that a random key be generated by the CPU.

At block 416, the TDRM may identify an available host key identifier (HKID) stored in a key ownership table (KOT). As discussed above, the KOT may be a data structure, invisible to software executing on the processor, used to manage HKID inventory within TDX. In some embodiments, TDX may have a specific number of HKIDs available for use by all TDs generated by the TDRM. The KOT may maintain all HKIDs available for use by all TDs created on the processor. As discussed above, a HKID may have a state of assigned, free (or available), reclaimed, or configured.

At block 418, the TDRM may store the HKID in the TDCS. During execution of a tenant workload in an executed TD, the HKID stored in TDCS may be used as part of a protection mechanism (e.g., TME, MK-TME) to prevent malicious or untrusted software (including the TDRM) from accessing memory pages of the TDPM.

At block 420, the TDRM may assign the one-time cryptographic key to the available HKID on a multi-key total memory encryption (MK-TME) engine. The TDRM may execute a specific instruction (e.g., TDCONFIGKEY) to configure the one-time cryptographic key and the available HKID on MK-TME engines on all packages for which the TD may operate. The TDCONFIGKEY instruction may correspond to the PCONFIG instruction used to define and/or configure a protected domain of system 300 described with respect to FIG. 3. By executing the TDCONFIGKEY instruction, the TDRM may cause a memory protection controller of a MK-TME engine (e.g., memory protection controller 306 of FIG. 3) to program the key and a protection mode for the TD. The memory protection controller may then return a status code to the TDRM indicating that the key has been configured.

At block 422, the TDRM may associate a logical processor with the TD. The TD may operate on the associated logical processor. TDRM may act as a full host and have full control over the logical processor and the processing core on which the logical processor is operating. The actions required to associate a logical processor with the TD are described in further detail with respect to FIG. 6.

Figure 7:
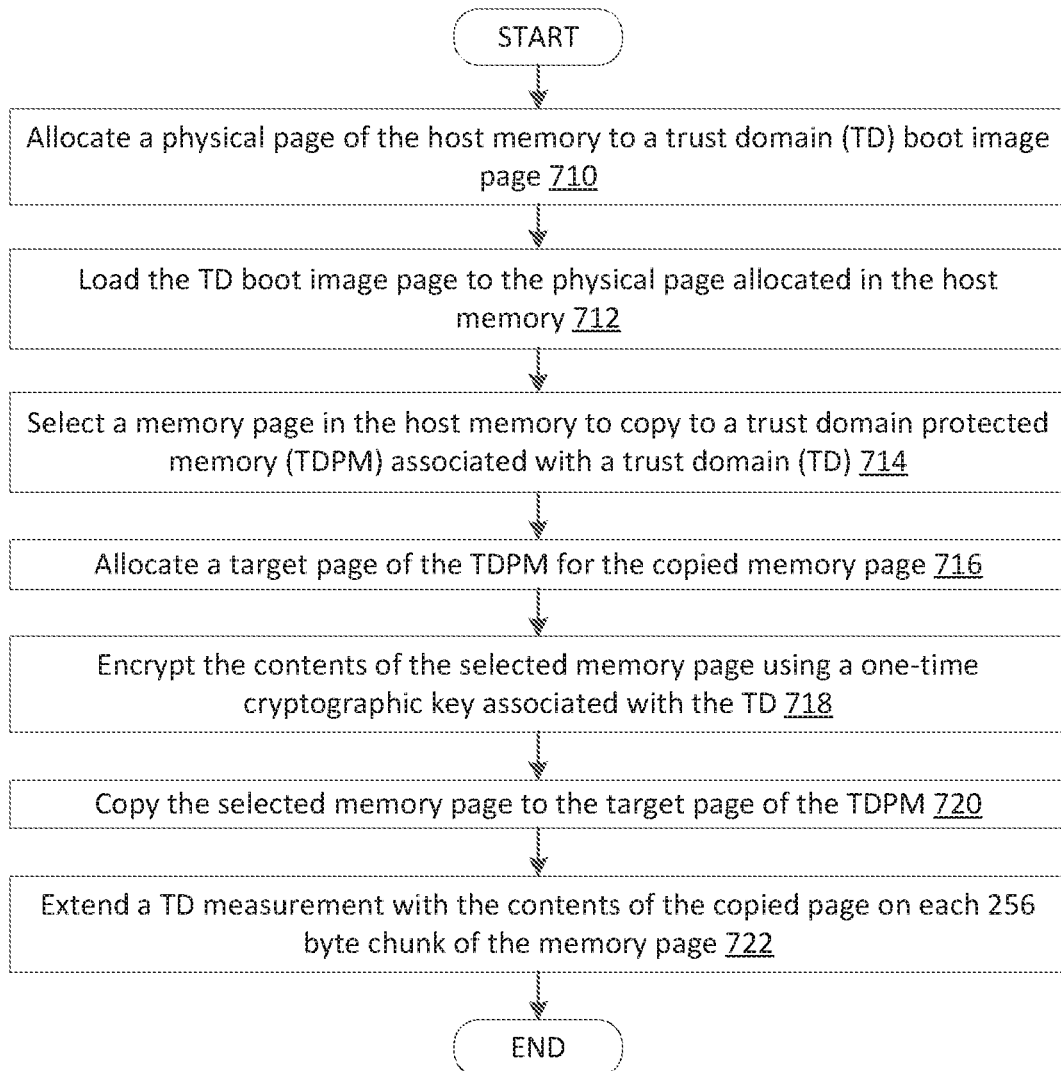
FIG. 7 illustrates a flow diagram for a method of adding a memory page from an address space of a logical processor to a TDPM, according to embodiments of the present disclosure.

At block 424, the TDRM may add a memory page from the address space of the logical processor to the TDPM, which is described in more detail with respect to FIG. 7.

At block 426, the TDRM may measure the memory page by extending a TD measurement by a content item of the memory page. The TDRM may execute a specific instruction (e.g., TDEXTEND) to extend the TD measurement with the contents of the added page. A measurement is extended on the TD to prevent the instructions used to create the TD from being used again (e.g., TDCREATE, TDADDPAGE, etc.). The measurement of the TD may be obtained by computing a secure hash over the inputs of instructions used to create the TD and load the initial code and data into its memory (e.g., TDCREATE, TDADD, and TDEXTEND). The measurement may be computed using a secure hashing algorithm so the system software can only build a TD that matches an expected measurement by following the exact sequence of instructions executed by the TDRM. The TDX design may use a 256-bit SHA-2 secure hash function to compute the measurements. In one embodiment, the TD measurement may be extended on each 256 byte chunk of the page added to TDPM. The measurement is repeated until each 256 byte chunk of the added TD page has been measured. Each TD measurement may be stored in a field of the TDCS.

Figure 8:
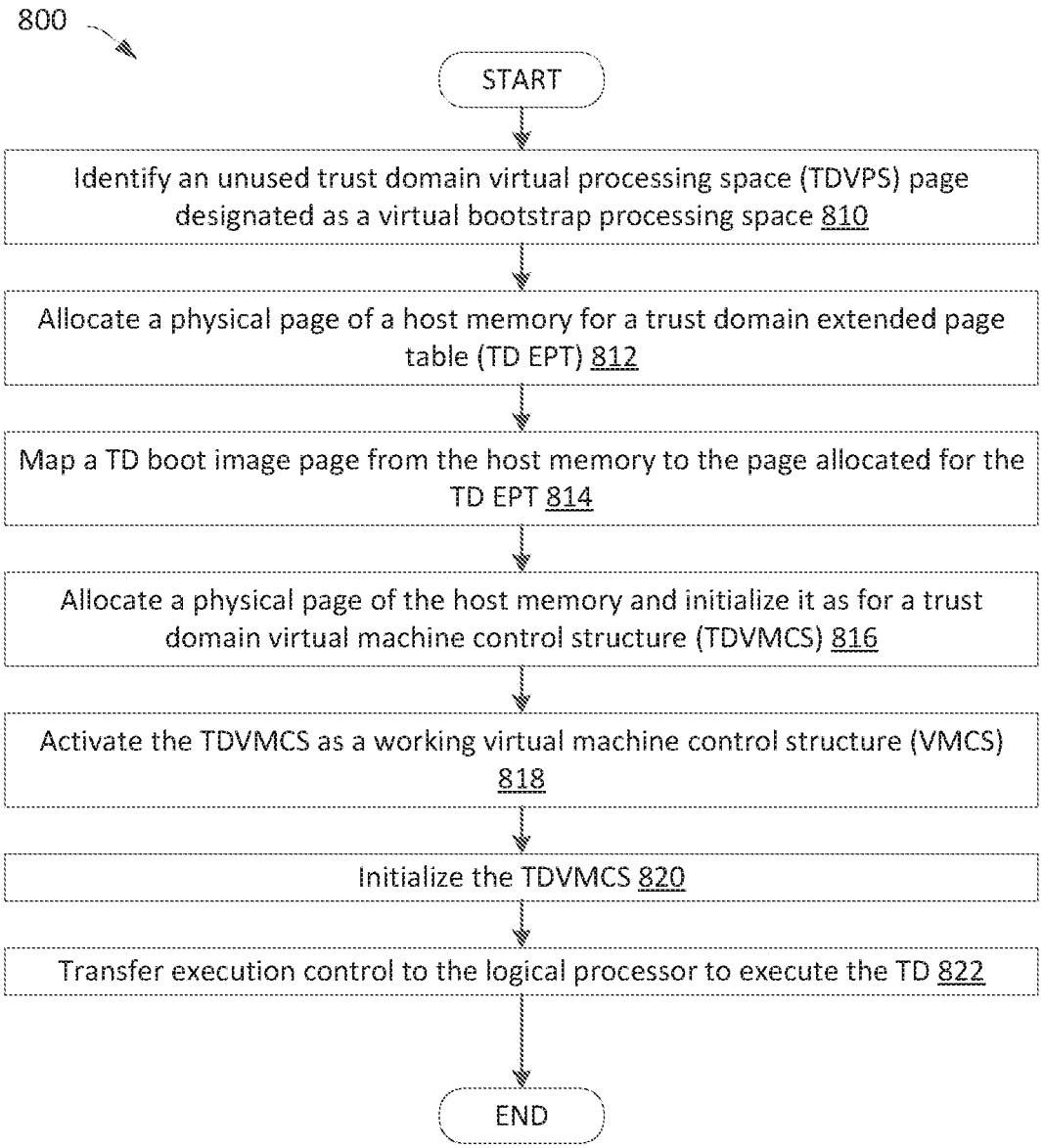
FIG. 8 illustrates a flow diagram for a method of transferring execution control to a logical processor to execute a TD, according to embodiments of the present disclosure.

At block 428, the TDRM may transfer execution control to the logical processor associated with the TD to execute the TD, which is described in more detail with respect to FIG. 8.

Figure 5:
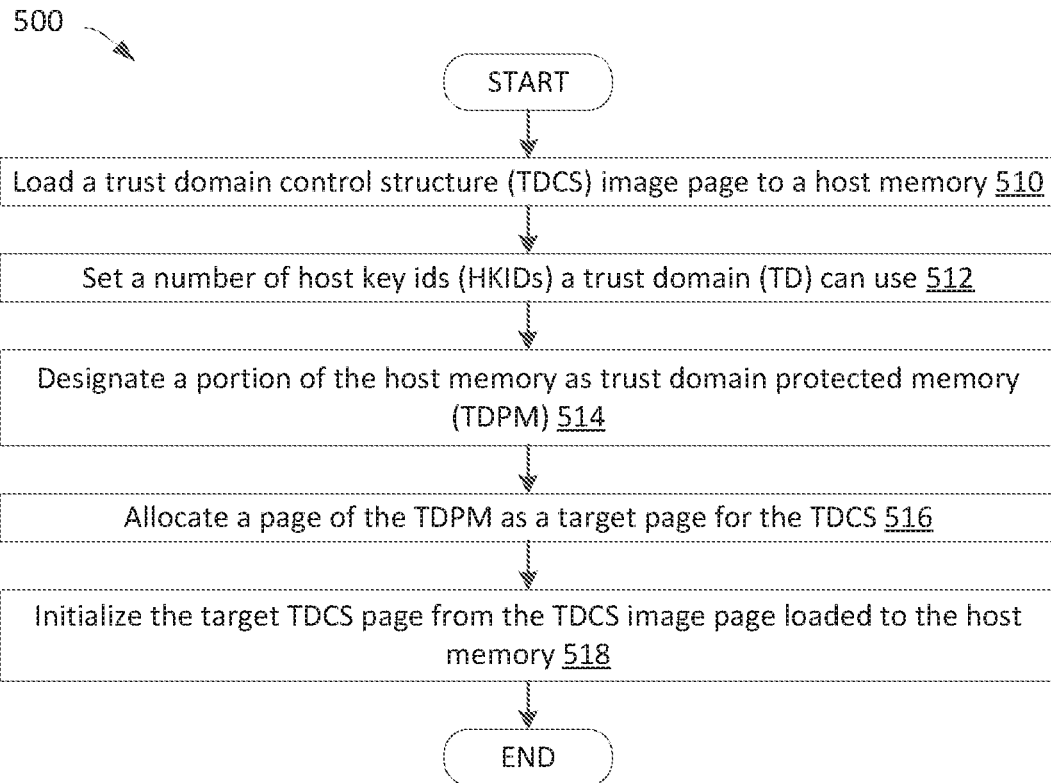
FIG. 5 illustrates a flow diagram for a method of initializing a trust domain control structure (TDCS) and a trust domain protected memory (TDPM), according to embodiments of the present disclosure.

FIG. 5 illustrates a flow diagram for a method 500 of initializing a TDCS and a TDPM associated with the TD. Method 500 may correspond with the operations performed at 410 (i.e., initialize a TDCS associated with a TD) and 412 (i.e., initialize a TDPM associated with the TD) of method 400 illustrated in FIG. 4.

At block 510, a TDCS image page may be loaded by the TDRM to the host memory.

At block 512, a number of HKIDS the TD can use may be set by the TDRM. In one embodiment, the TD may be allocated one HKID, and therefore would only have one one-time cryptographic key available to encrypt the TDPM. In another embodiment, the TD may be allocated multiple HKIDs, and therefore would have multiple one-time cryptographic keys available to encrypt the TDPM. The number of HKIDS may be saved to the TDCS image page.

At block 514, a portion of the host memory may be designated as the TDPM. As discussed above, the TDPM may occupy a 4 KB naturally occurring region of host memory (e.g., a page of memory).

At block 516, a page of the TDPM may be allocated as a target page for the TDCS.

At block 518, a target TDCS page may be initialized from the TDCS image page loaded to the TDPM.

Figure 6:
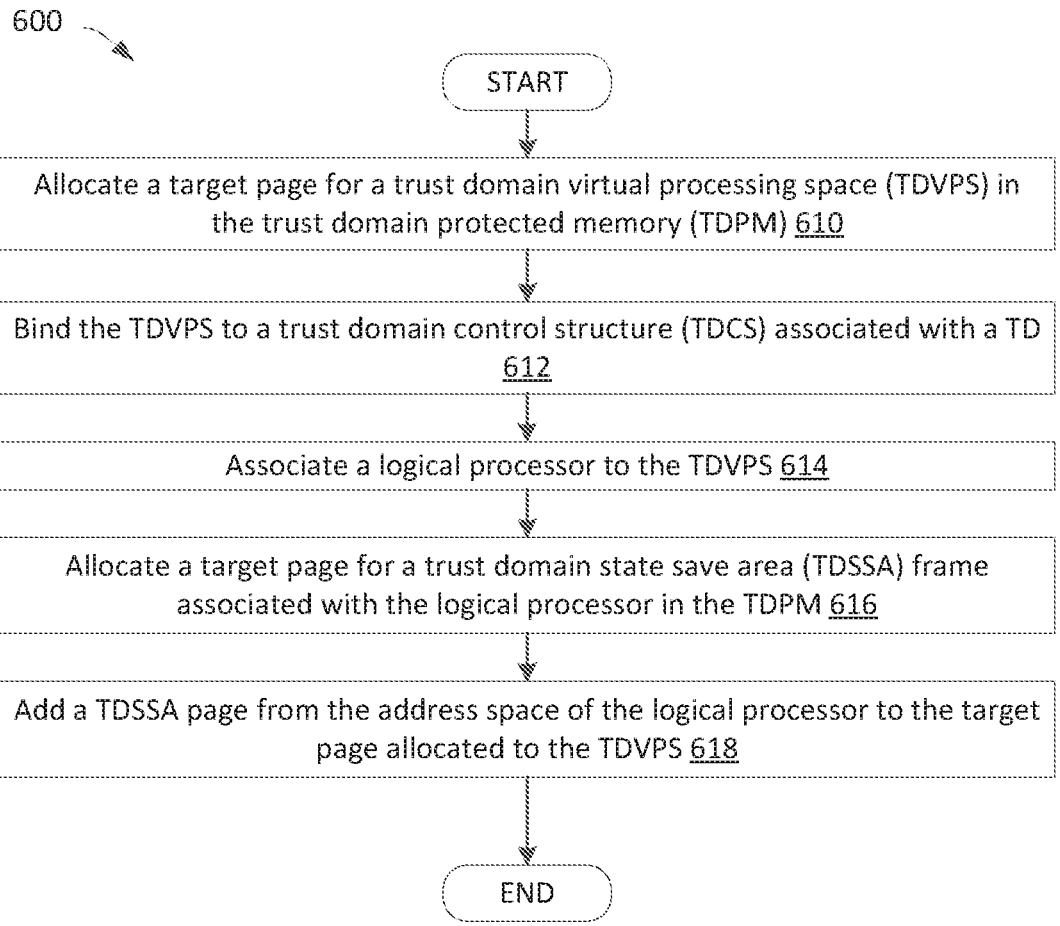
FIG. 6 illustrates a flow diagram for a method of associating a logical processor with a TD, according to embodiments to the present disclosure.

FIG. 6 illustrates a flow diagram for a method 600 of associating a logical processor with a TD. Method 600 may correspond with the operation performed at block 422 (i.e., associate a logical processor with the TD) of method 400 illustrated in FIG. 4.

At block 610, the TDRM may allocate a target page for a trust domain virtual processing space (TDVPS) in the TDPM. The TDVPS may include one or more processing threads emulating virtual processors associated with the TD.

At block 612, the TDRM may bind the TDVPS to the TDCS associated with the TD.

At block 614, the TDRM may associate a logical processor to the TDVPS. The logical processor may be an executable thread on the processing core to execute the tenant workload of the TD.

At block 616, the TDRM may allocate a target page for a TD state save area (SSA) frame associated with the logical processor in the TDPM. A TD SSA may be included as part of the TDTCS discussed previously with reference to FIGS. 1A and 1B. The TD SSA may be a secure memory page that stores the state of a tenant process executing within the TD.

At block 618, the TDRM may add a TD SSA page from the address space of the logical processor to the target page allocated to the TDVPS. The TDRM may execute a specific instruction (e.g., TDADDSSA), providing the address of the target page as input, to add a TDSSA page. The execution of this instruction may bind the TD SSA page to the TDVPS.

The previously described operations of method 600 may be performed for each TDVPS created by the TDRM. It should be noted that the first TDVPS created by the TDRM may be a virtual bootstrap processor (BSP). The virtual BSP may be allocated for any bootstrap operations required during the TD create process. Any subsequent TDVPS created by the TDRM may be a virtual application processor (AP). A virtual AP may be allocated for any tenant operations required while the TD is executing.

FIG. 7 illustrates a flow diagram for a method 700 of adding a memory page from the address space of the logical processor to the TDPM. Method 700 may correspond with the operation performed at block 424 (i.e., add a memory page from the address space of the logical processor to the TDPM) of method 400 illustrated in FIG. 4.

At block 710, the TDRM may allocate a physical page of the host memory to a TD boot image page. In one embodiment, the TDRM may allocate multiple physical pages of the host memory to the TD boot image page.

At block 712, the TDRM may load the TD boot image page to the physical page allocated in the host memory. The TD boot image page may contain code and data pages used when the TD is first executed by the logical processor associated with the TD.

At block 714, the TDRM may select a memory page in the host memory to copy to the TDPM associated with the TD.

At block 716, the TDRM may allocate a target page of the TDPM for the copied memory page.

At block 718, the TDRM may encrypt the contents of the selected memory page using a one-time cryptographic key associated with the TD. The one-time cryptographic key may be the same key generated by the TDRM in block 414 (i.e., generate a one-time cryptographic key) of method 400 illustrated in FIG. 4.

At block 720, the TDRM may copy the selected memory page to the target page of the TDPM.

At block 722, the TDRM may extend a TD measurement with the contents of the copied page on each 256 byte chunk of the memory page.

FIG. 8 illustrates a flow diagram for a method 800 of transferring execution control to the logical processor to execute the TD. Method 800 may correspond with the operation performed at block 428 (i.e., transfer execution control to the logical processor to execute the TD) of method 400 illustrated in FIG. 4. The following operations may be performed on each logical processor on which the TDRM wants to launch the TD.

At block 810, the TDRM may identify an unused TDVPS page designated as a virtual bootstrap processing space.

At block 812, the TDRM may allocate a physical page of a host memory for a TD EPT.

At block 814, the TDRM may map a TD boot image page from the host memory to the page allocated for the TD EPT. The TD boot image page may be the same TD boot image page loaded to the physical page allocated in the host memory of block 712 (i.e., load the TD boot image page to the physical page allocated in the host memory) of method 700 illustrated in FIG. 7.

At block 816, the TDRM may allocate a physical page of the host memory and initialize it for a trust domain virtual machine control structure (TDVMCS).

At block 818, the TDRM may activate the TDVMCS as a working virtual machine control structure (VMCS). The TDRM may execute a specific instruction (e.g., VMPTRLD), which activates the TDVMCS as the working VMCS.

At block 820, the TDRM may initialize the TDVMCS. The TDRM may execute a specific instruction (e.g., VMWRITE), which initializes the TDVMCS. The executed instruction may set a host state for the TDVMCS. The executed instruction may also set a pointer to the TD EPT and set a link to the selected TDVPS page.

At block 822, the TDRM may transfer execution control to the logical processor to execute the TD.

FIG. 9 illustrates a flow diagram for a method 900 for destroying a TD. In embodiments of this disclosure, a TD may be destroyed by the TDRM. The TDRM may destroy a TD by executing a specific instruction (e.g., TDSTOP), which may initiate the TD destruction process.

At block 910, the TDRM may prevent a TD from executing on a logical processor, which is described in more detail with respect to FIG. 10.

At block 912, the TDRM may flush a cache entry of a cache associated with the logical processor, where the cache entry contains contents of a memory page associated with the TD.

At block 914, the TDRM may mark a HKID assigned to a one time cryptographic key associated with the TD as reclaimed. As discussed above, if a HKID is marked as reclaimed, the HKID is no longer assigned to a one-time cryptographic key associated with the TD being destroyed, but is not ready for assignment by the TDRM to other one-time cryptographic keys associated with other TDs. The TDRM may not mark the HKID as available until all cache entries of the cache associated with the logical processor have been flushed.

At block 916, the TDRM may decide whether all cache entries of the cache associated with the logical processor have been flushed. If the TDRM has determined that all cache entries of the cache associated with the logical processor have not been flushed, the TDRM may maintain the status of the HKID in the KOT as reclaimed. In one embodiment, the TDRM may flush all entries of a translation lookaside buffer (TLB) associated with the logical processor.

At block 918, the TDRM may mark the HKID as available for assignment to other one-time cryptographic keys associated with other TDs. By changing the state of the HKID to available, the HKID may be assigned to other one-time cryptographic keys without risk that the contents protected by the previously assigned key could be accessed.

At block 920, the TDRM may remove a memory page from a TDPM associated with the TD, which is described in more detail with respect to FIG. 11.

FIG. 10 illustrates a flow diagram for a method 1000 of preventing a TD from executing on a logical processor. Method 1000 may correspond with the operations performed at blocks 910 (i.e., prevent a TD from executing on a logical processor) and 912 (i.e., flush a cache entry of a cache associated with the logical processor, where the cache entry contains contents of a memory page associated with the TD) of method 900 illustrated in FIG. 9.

At block 1010, the TDRM may select a TD operating on a host machine to destroy. A TD may be destroyed because a tenant process operating within the TD has terminated. A TD may also be destroyed to reallocate unavailable HKIDs to other TDs the TDRM will later create.

At block 1012, the TDRM may prevent instructions stored in a memory page of the TDPM associated with the TD from executing on the host machine.

At block 1014, the TDRM may broadcast an inter-processor interrupt to a logical processor executing an instruction stored in a memory page of the TDRM, causing an exit on the logical processor.

At block 1016, the TDRM may flush a cache entry of a cache associated with the logical processor, where the cache entry contains contents of a memory page associated with the TD.

FIG. 11 illustrates flow diagram for a method 1100 for removing a memory page from a TDPM associated with a TD. Method 1100 may correspond with the operation performed at block 920 (i.e., remove a memory page from a TDPM associated with the TD) of method 900 illustrated in FIG. 9.

At block 1110, the TDRM may remove a memory page associated with a tenant workload operating on a TD from a TDPM. The TDRM may execute a specific instruction (e.g., TDREMOVEPAGE) and provide the address of the memory page associated with the tenant workload in order to remove the memory page.

At 1112, the TDRM may remove a memory page allocated to a TD EPT from a host memory associated with a logical processor executing the TD. The TDRM may execute a specific instruction (e.g., TDREMOVEPAGE) and provide the address of the memory page allocated to the TD EPT in order to remove the memory page from host memory.

At block 1114, the TDRM may remove a memory page allocated to a TD state save area (SSA) frame from the TDPM. The TDRM may execute a specific instruction (e.g., TDREMOVEPAGE) and provide the address of the memory page allocated to the TD SSA frame in order to remove the memory page from the TDPM.

At block 1116, the TDRM may remove a memory page allocated to a TD VPS from the TDPM. The TDRM may execute a specific instruction (e.g., TDREMOVEPAGE) and provide the address of the memory page allocated to the TD VPS in order to remove the memory page from the TDPM.

At block 1118, the TDRM may remove a memory page allocated to a TDCS from the TDPM. The TDRM may execute a specific instruction (e.g., TDREMOVEPAGE) and provide the address of the memory page allocated to the TDCS in order to remove the memory page from the TDPM.

At block 1120, the TDRM may remove a page allocated to a TD VMCS from the host memory. The TDRM may execute a specific instruction (e.g., VMCLEAR) and provide the address of the memory page allocated to the TD VMCS in order to remove the memory page from host memory.

Figure 12A:
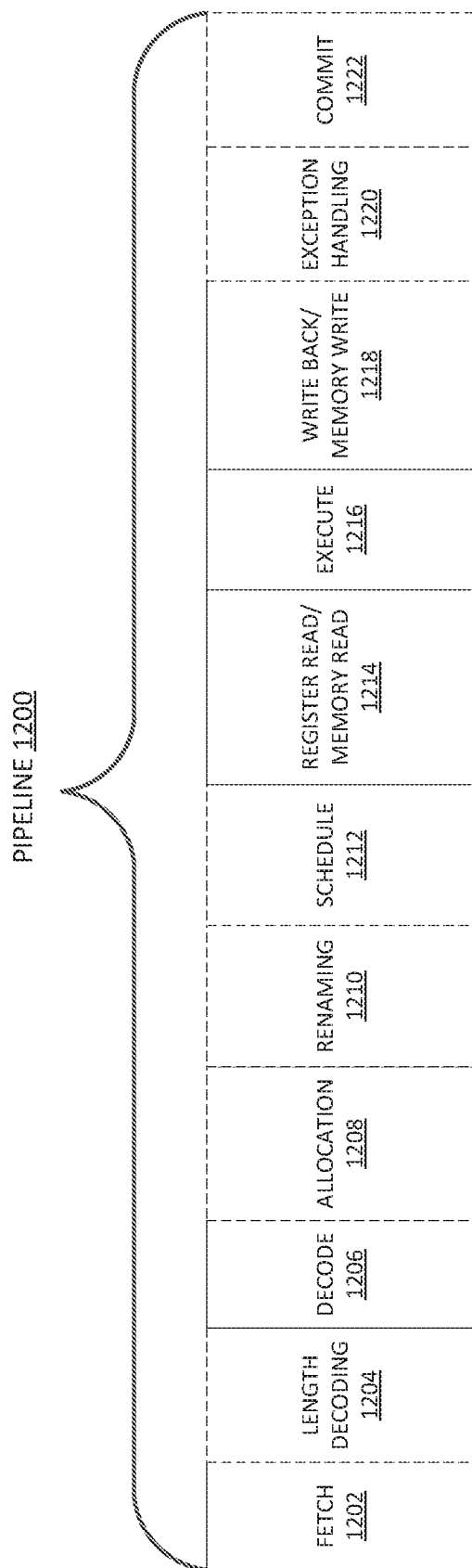
FIG. 12A illustrates a block diagram of a micro-architecture for a processor in which one implementation of the present disclosure may be used.
Figure 12B:
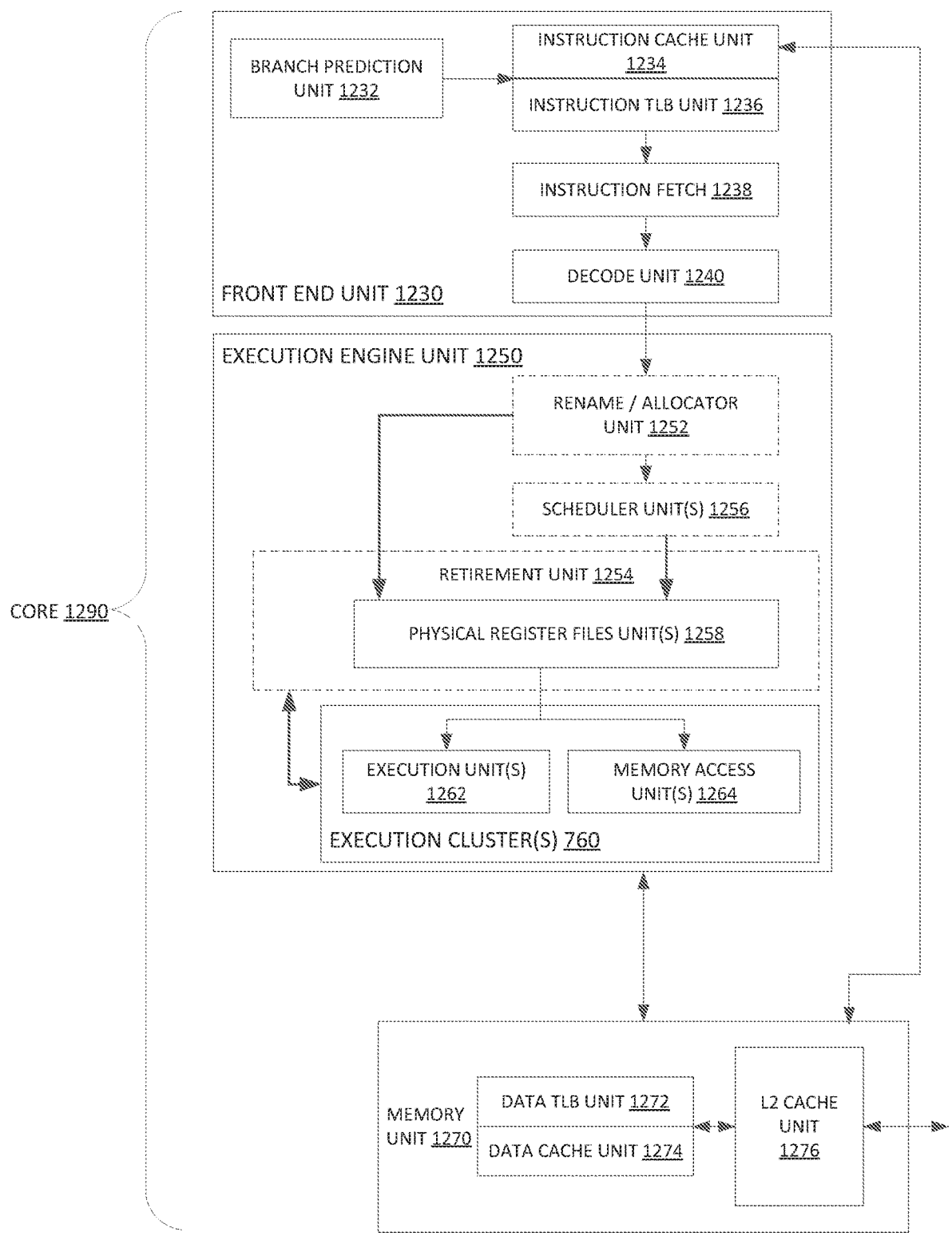
FIG. 12B is a block diagram illustrating an in-order pipeline and a register renaming stage, out-of-order issue/execution pipeline implemented according to at least one implementation of the present disclosure.

FIG. 12A illustrates a block diagram of an in-order pipeline and a register renaming stage, out-of-order issue/execution pipeline of a processor monitoring performance of a processing device to provide isolation in virtualized systems using trust domains according to at least one implementation of the disclosure. FIG. 12B illustrates a block diagram of an in-order architecture core and a register renaming logic, out-of-order issue/execution logic to be included in a processor according to at least one implementation of the disclosure. The solid lined boxes in FIG. 12A illustrate the in-order pipeline, while the dashed lined boxes illustrates the register renaming, out-of-order issue/execution pipeline. Similarly, the solid lined boxes in FIG. 12B illustrate the in-order architecture logic, while the dashed lined boxes illustrates the register renaming logic and out-of-order issue/execution logic.

In FIG. 12A, a processor pipeline 1200 includes a fetch stage 1202, a length decode stage 1204, a decode stage 1206, an allocation stage 1208, a renaming stage 1210, a scheduling (also known as a dispatch or issue) stage 1212, a register read/memory read stage 1214, an execute stage 1216, a write back/memory write stage 1218, an exception handling stage 1222, and a commit stage 1224. In some implementations, the stages are provided in a different order and different stages may be considered in-order and out-of-order.

In FIG. 12B, arrows denote a coupling between two or more units and the direction of the arrow indicates a direction of data flow between those units. FIG. 12B shows a processor core (core) 1290 including a front end unit 1230 coupled to an execution engine unit 1250, and both are coupled to a memory unit 1270.

The core 1290 may be a reduced instruction set computing (RISC) core, a complex instruction set computing (CISC) core, a very long instruction word (VLIW) core, or a hybrid or alternative core type. As yet another option, the core 1290 may be a special-purpose core, such as, for example, a network or communication core, compression engine, graphics core, or the like.

The front end unit 1230 includes a branch prediction unit 1232 coupled to an instruction cache unit 1234, which is coupled to an instruction lookaside buffer (TLB) 1236, which is coupled to an instruction fetch unit 1238, which is coupled to a decode unit 1240. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 1234 is further coupled to a L2 cache unit 1276 in the memory unit 1270. The decode unit 1240 is coupled to a rename/allocator unit 1252 in the execution engine unit 1250.

The execution engine unit 1250 includes the rename/allocator unit 1252 coupled to a retirement unit 1254 and a set of one or more scheduler unit(s) 1256. The scheduler unit(s) 1256 represents any number of different schedulers, including reservations stations, central instruction window, etc. The scheduler unit(s) 1256 is coupled to the physical register file(s) unit(s) 1258. Each of the physical register file(s) 1258 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 1258 is overlapped by the retirement unit 1254 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 1254 and the physical register file(s) unit(s) 1258 are coupled to the execution cluster(s) 1260. The execution cluster(s) 1260 includes a set of one or more execution units 1262 and a set of one or more memory access units 1264. The execution units 1262 may perform various operations (e.g., shifts, addition, subtraction, multiplication) and on various types of data (e.g., scalar floating point, packed integer, packed floating point, vector integer, vector floating point).

While some implementations may include a number of execution units dedicated to specific functions or sets of functions, other implementations may include one execution unit or multiple execution units that all perform all functions. The scheduler unit(s) 1256, physical register file(s) unit(s) 1258, and execution cluster(s) 1260 are shown as being possibly plural because certain implementations create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain implementations in which the execution cluster of this pipeline has the memory access unit(s) 1264). It should also be understood that where separate pipelines are used, one or more of these pipelines may be out-of-order issue/execution and the rest in-order.

The set of memory access units 1264 is coupled to the memory unit 1270, which includes a TLB unit 1272 coupled to a data cache unit 1274 coupled to a level 2 (L2) cache unit 1276. In one exemplary implementation, the memory access units 1264 may include a load unit, a store address unit, and a store data unit, each of which is coupled to the data TLB unit 1272 in the memory unit 1270. The L2 cache unit 1276 is coupled to one or more other levels of cache and eventually to a main memory.

By way of example, the exemplary register naming, out-of-order issue/execution core architecture may implement the pipeline 1200 of FIG. 12A as follows: 1) the instruction fetch 1238 performs the fetch and length decoding stages 1202 and 1204 respectively; 2) the decode unit 1240 performs the decode stage 1206; 3) the rename/allocator unit 1252 performs the allocation stage 1208 and renaming stage 1210; 4) the scheduler unit(s) 1256 performs the schedule stage 1212; 5) the physical register file(s) unit(s) 1258 and the memory unit 1270 perform the register read/memory read stage 1214; 6) the memory unit 1270 and the physical register file(s) unit(s) 1258 perform the write back/memory write stage 1218; 7) various units may be involved in the exception handling stage 1222; and 8) the retirement unit 1254 and the physical register file(s) unit(s) 1258 perform the commit stage 1224.

The core 1290 may support one or more instruction sets including: (e.g., the x86 instruction set (with some extensions that may have been added with newer versions); the MIPS instruction set of MIPS Technologies of Sunnyvale, CA; the ARM instruction set (with additional extensions such as NEON) of ARM Holdings of Sunnyvale, CA); and various other instruction set architectures, such as RISC.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in in-order architecture. While the illustrated implementation of the processor also includes a separate instruction and data cache units 1234/1274 and a shared L2 cache unit 1276, alternative implementations may have a single internal cache for both instructions and data, such as, for example, a L1 internal cache, or multiple levels of internal cache. In some implementations, the system may include a combination of an internal cache and an external cache that is external to the core and/or the processor. Alternatively, all of the cache may be external to the core and/or the processor.

Figure 13:
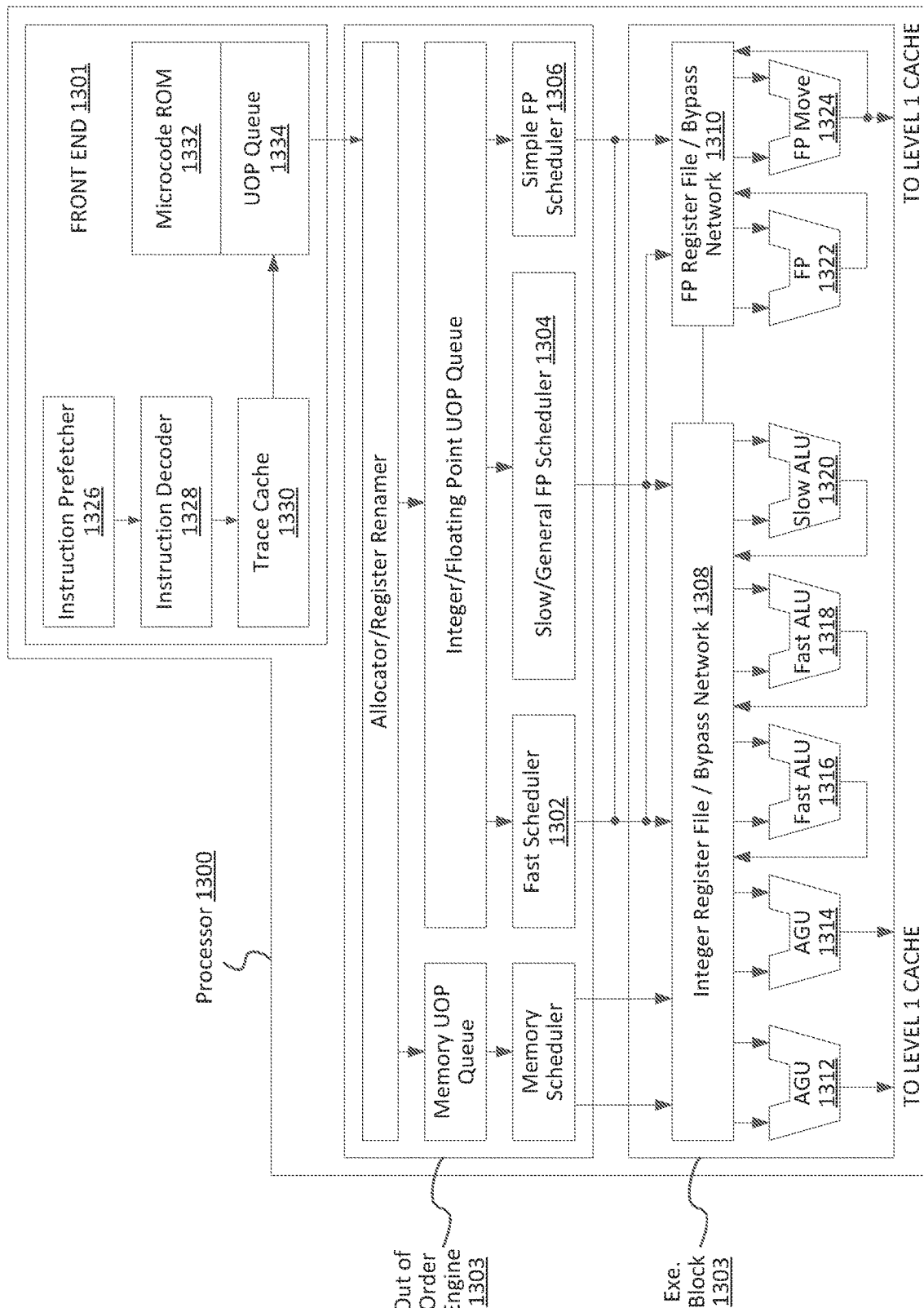
FIG. 13 illustrates a block diagram of the micro-architecture for a processing device that includes logic circuits to provide isolation in virtualized systems using TDs, according to embodiments of the present disclosure.

FIG. 13 illustrates a block diagram of the micro-architecture for a processing device 1300 that includes logic circuits to provide isolation in virtualized systems using trust domains according to one implementation. In some implementations, an instruction can be implemented to operate on data elements having sizes of byte, word, doubleword, quadword, etc., as well as datatypes, such as single and double precision integer and floating point datatypes. In one implementation the in-order front end 1301 is the part of the processing device 1300 that fetches instructions to be executed and prepares them to be used later in the processing device pipeline. The implementations of providing isolation in virtualized systems using trust domains can be implemented in processing device 1300.

The front end 1301 may include several units. In one implementation, the instruction prefetcher 1316 fetches instructions from memory and feeds them to an instruction decoder 1318 which in turn decodes or interprets them. For example, in one implementation, the decoder decodes a received instruction into one or more operations called "micro-instructions" or "micro-operations" (also called micro op or uops) that the machine can execute. In other implementations, the decoder parses the instruction into an opcode and corresponding data and control fields that are used by the micro-architecture to perform operations in accordance with one implementation. In one implementation, the trace cache 1330 takes decoded uops and assembles them into program ordered sequences or traces in the uop queue 1334 for execution. When the trace cache 1330 encounters a complex instruction, the microcode ROM 1332 provides the uops needed to complete the operation.

Some instructions are converted into a single micro-op, whereas others need several micro-ops to complete the full operation. In one implementation, if more than four micro-ops are needed to complete an instruction, the decoder 1318 accesses the microcode ROM 1332 to do the instruction. For one implementation, an instruction can be decoded into a small number of micro ops for processing at the instruction decoder 1318. In another implementation, an instruction can be stored within the microcode ROM 1332 should a number of micro-ops be needed to accomplish the operation. The trace cache 1330 refers to an entry point programmable logic array (PLA) to determine a correct micro-instruction pointer for reading the microcode sequences to complete one or more instructions in accordance with one implementation from the microcode ROM 1332. After the microcode ROM 1332 finishes sequencing micro-ops for an instruction, the front end 1301 of the machine resumes fetching micro-ops from the trace cache 830.

The out-of-order execution engine 1303 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 1302, slow/general floating point scheduler 1304, and simple floating point scheduler 1306. The uop schedulers 1302, 1304, 1306, determine when a uop is ready to execute based on the readiness of their dependent input register operand sources and the availability of the execution resources the uops need to complete their operation. The fast scheduler 1302 of one implementation can schedule on each half of the main clock cycle when other schedulers can only schedule once per main processing device clock cycle. The schedulers arbitrate for the dispatch ports to schedule uops for execution.

Register files 1308, 1310, sit between the schedulers 1302, 1304, 1306, and the execution units 1312, 1314, 1316, 1318 in the execution block 1311. There is a separate register file 1308, 1310 for integer and floating point operations, respectively. Each register file 1308, 1310 of one implementation also includes a bypass network that can bypass or forward just completed results that have not yet been written into the register file to new dependent uops. The integer register file 1308 and the floating point register file 1310 are also capable of communicating data with the other. For one implementation, the integer register file 1308 is split into two separate register files, one register file for the low order 32 bits of data and a second register file for the higher order 32 bits of data. The floating point register file 1310 of one implementation has 128 bit wide entries because floating point instructions typically have operands from 64 to 128 bits in width.

The execution block 1311 contains the execution units 1312, 1314, 1316, 1318, where the instructions are actually executed. This section includes the register files 1308, 1310 that store the integer and floating point data operand values that the micro-instructions need to execute. The processing logic 1300 of one implementation is comprised of a number of execution units: address generation unit (AGU) 1312, AGU 1314, ALU 1316, fast ALU 1318, slow ALU 1310, floating point ALU 1312, floating point move unit 1314. For one implementation, the floating point execution blocks 1312, 1314 execute floating point, MMX, SIMD, and SSE, or other operations. The floating point ALU 1312 of one implementation includes a 64 bit by 64 bit floating point divider to execute divide, square root, and remainder micro-ops. For implementations of the disclosure, instructions involving a floating point value may be handled with a floating point hardware.

In one implementation, the ALU operations go to the high-speed ALU execution units 1316, 1318. The fast ALUs 1316, 1318 of one implementation can execute fast operations with an effective latency of half a clock cycle. For one implementation, most complex integer operations go to the slow ALU 1310 as the slow ALU 1310 includes integer execution hardware for long latency type of operations, such as a multiplier, shifts, flag logic, and branch processing. Memory load/store operations are executed by the AGUs 1312, 1314. For one implementation, the integer ALUs 1316, 1318, 1310 are described in the context of performing integer operations on 64 bit data operands. In alternative implementations, the ALUs 1316, 1318, 1310 can be implemented to support a variety of data bits including 16, 32, 128, 256, etc. Similarly, the floating point units 1312, 1314 can be implemented to support a range of operands having bits of various widths. For one implementation, the floating point units 1312, 1314 can operate on 128 bits wide packed data operands in conjunction with SIMD and multimedia instructions.

In one implementation, the uops schedulers 1302, 1304, 1306 dispatch dependent operations before the parent load has finished executing. As uops are speculatively scheduled and executed in processing device 1300, the processing device 1300 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one implementation of a processing device are also designed to catch instruction sequences for text string comparison operations.

The processing device 1300 also includes logic to provide isolation in virtualized systems using trust domains according to one implementation. In one implementation, the execution block 1311 of processing device 1300 may include TDRM 180, MOT 160, TDCS 124, and TDTCS 128 described with reference to FIGS. 1A and 1B to provide isolation in virtualized systems using trust domains, according to the description herein.

The term "registers" may refer to the on-board processing device storage locations that are used as part of instructions to identify operands. In other words, registers may be those that are usable from the outside of the processing device (from a programmer's perspective). However, the registers of an implementation should not be limited in meaning to a particular type of circuit. Rather, a register of an implementation is capable of storing and providing data, and performing the functions described herein. The registers described herein can be implemented by circuitry within a processing device using any number of different techniques, such as dedicated physical registers, dynamically allocated physical registers using register renaming, combinations of dedicated and dynamically allocated physical registers, etc. In one implementation, integer registers store thirty-two bit integer data. A register file of one implementation also contains eight multimedia SIMD registers for packed data.

For the discussion herein, the registers are understood to be registers designed to hold packed data, such as 64 bits wide MMX™ registers (also referred to as "mm" registers in some instances) in microprocessing devices enabled with MMX technology from Intel Corporation of Santa Clara, California. These MMX registers, available in both integer and floating point forms, can operate with packed data elements that accompany SIMD and SSE instructions. Similarly, 128 bits wide MMX registers relating to SSE2, SSE3, SSE4, or beyond (referred to generically as "SSEx") technology can also be used to hold such packed data operands. In one implementation, in storing packed data and integer data, the registers do not need to differentiate between the two data types. In one implementation, integer and floating point are either contained in the same register file or different register files. Furthermore, in one implementation, floating pint and integer data may be stored in different registers or the same registers.

Figure 14:
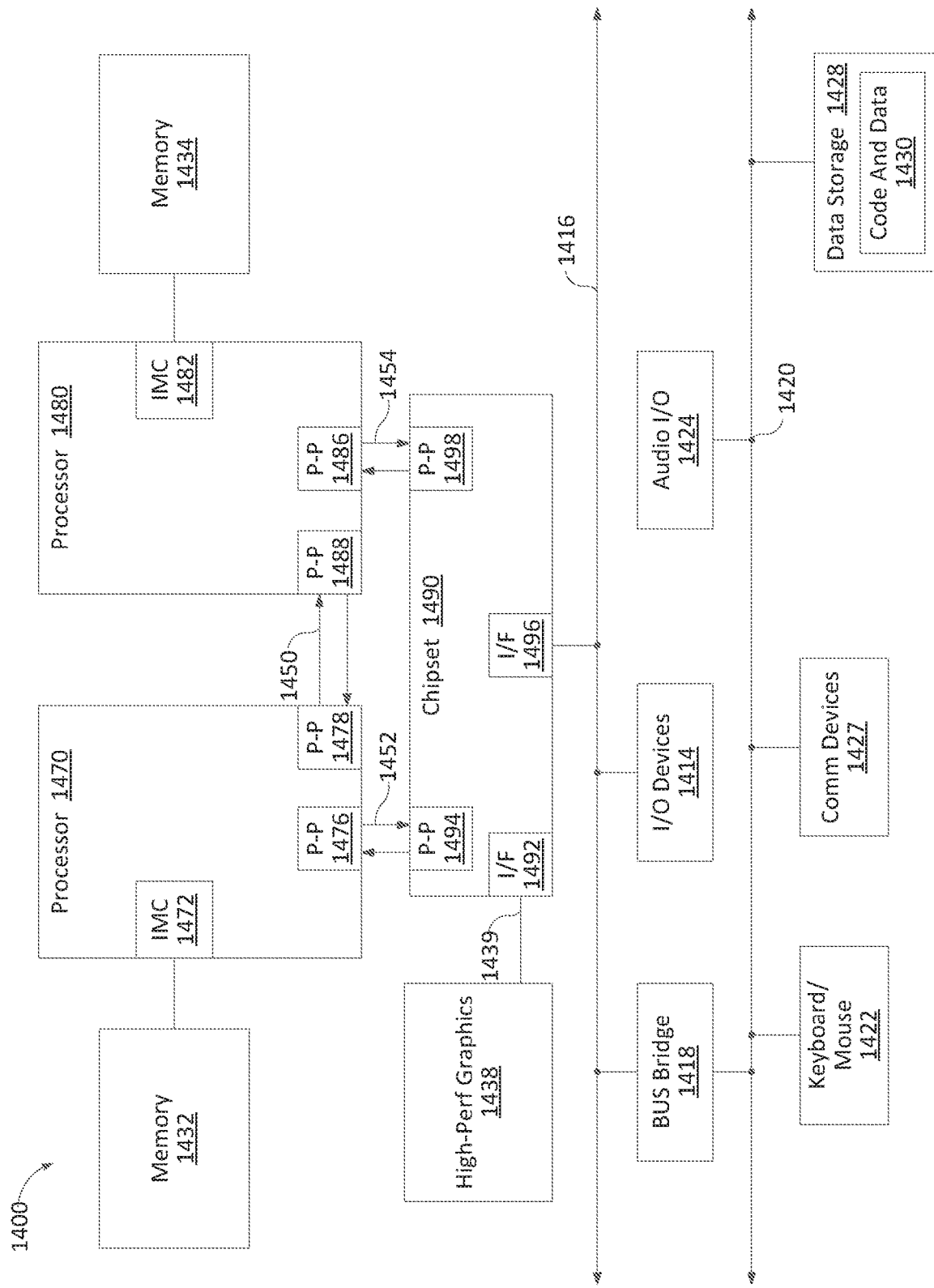
FIG. 14 illustrates a block diagram of a computer system, according to embodiments of the present disclosure.

Implementations may be implemented in many different system types. Referring now to FIG. 14, shown is a block diagram of a multiprocessing device system 1400 in accordance with an implementation. As shown in FIG. 14, multiprocessing device system 1400 is a point-to-point interconnect system, and includes a first processing device 1470 and a second processing device 1480 coupled via a point-to-point interconnect 1450. As shown in FIG. 14, each of processing devices 1470 and 1480 may be multicore processing devices, including first and second processing device cores (not shown), although potentially many more cores may be present in the processing devices. The processing devices each may include hybrid write mode logics in accordance with an implementation of the present. The implementations of providing isolation in virtualized systems using TDs, as well as implementations of creating and destroying TDs, can be implemented in the processing device 1470, processing device 1480, or both.

While shown with two processing devices 1470, 1480, it is to be understood that the scope of the disclosure is not so limited. In other implementations, one or more additional processing devices may be present in a given processing device.

Processing devices 1470 and 1480 are shown including integrated memory controller units 1472 and 1482, respectively. Processing device 1470 also includes as a part of its bus controller units point-to-point (P-P) interfaces 1476 and 1478; similarly, second processing device 1480 includes P-P interfaces 1486 and 1488. Processing devices 1470, 1480 may exchange information via a P-P interface 1450 using P-P interface circuits 1478, 1488. As shown in FIG. 14, IMCs 1472 and 1482 couple the processing devices to respective memories, namely a memory 1432 and a memory 1434, which may be portions of main memory locally attached to the respective processing devices.

Processing devices 1470, 1480 may each exchange information with a chipset 1490 via individual P-P interfaces 1452, 1454 using point to point interface circuits 1476, 1494, 1486, 1498. Chipset 1490 may also exchange information with a high-performance graphics circuit 1438 via a high-performance graphics interface 1439.

A shared cache (not shown) may be included in either processing device or outside of both processing devices, yet connected with the processing devices via P-P interconnect, such that either or both processing devices' local cache information may be stored in the shared cache if a processing device is placed into a low power mode.

Chipset 1490 may be coupled to a first bus 1416 via an interface 1496. In one implementation, first bus 1416 may be a Peripheral Component Interconnect (PCI) bus, or a bus such as a PCI Express bus or another third generation I/O interconnect bus, although the scope of the disclosure is not so limited.

As shown in FIG. 14, various I/O devices 1414 may be coupled to first bus 1416, along with a bus bridge 1418 which couples first bus 1416 to a second bus 1420. In one implementation, second bus 1420 may be a low pin count (LPC) bus. Various devices may be coupled to second bus 1420 including, for example, a keyboard and/or mouse 1422, communication devices 1427 and a storage unit 1428 such as a disk drive or other mass storage device which may include instructions/code and data 1430, in one implementation. Further, an audio I/O 1424 may be coupled to second bus 1420. Note that other architectures are possible. For example, instead of the point-to-point architecture of FIG. 14, a system may implement a multi-drop bus or other such architecture.

Figure 15:
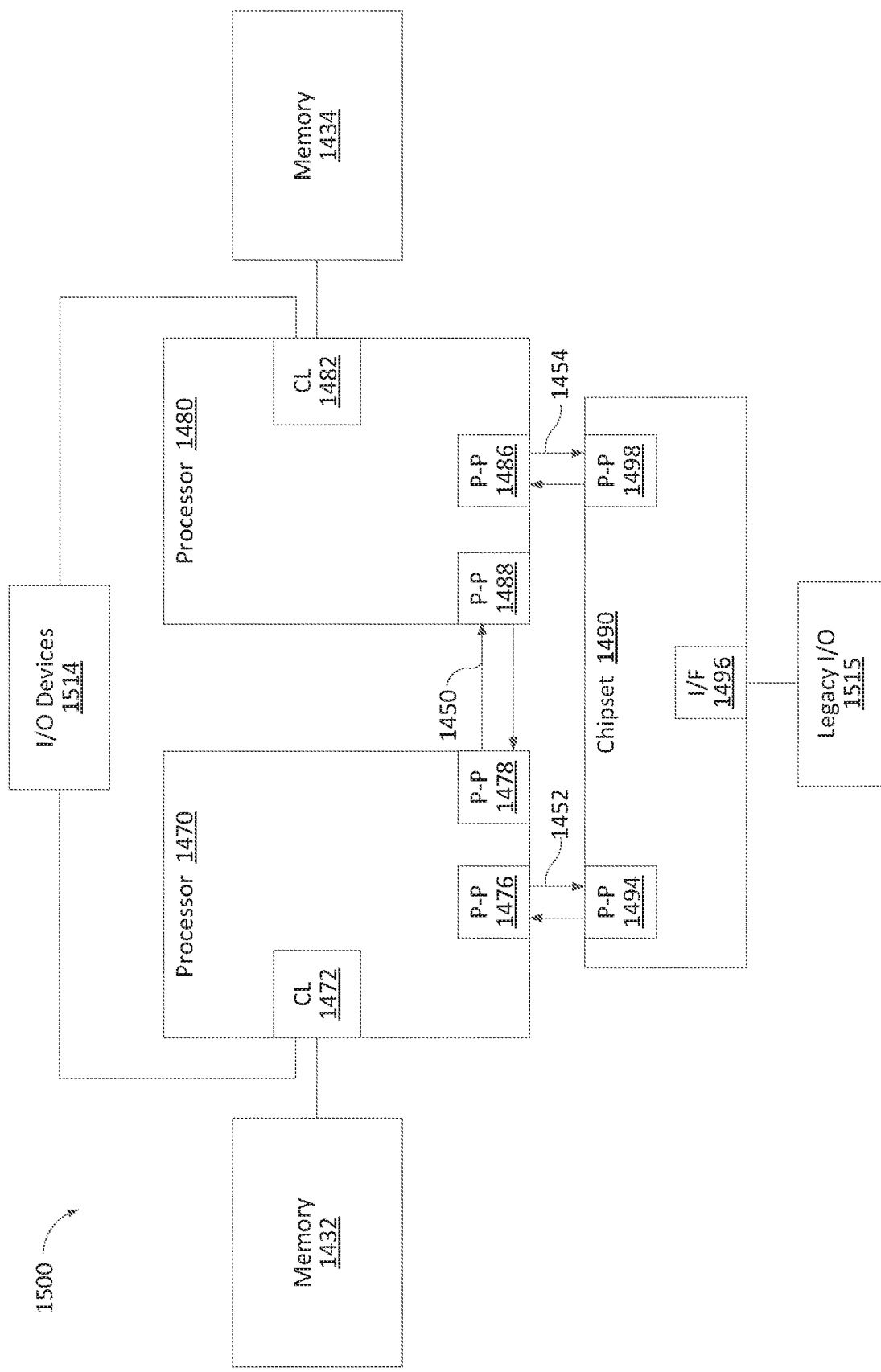
FIG. 15 illustrates a block diagram of a computer system, according to embodiments of the present disclosure.

Referring now to FIG. 15, shown is a block diagram of a third system 1500 in accordance with an implementation of the disclosure. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processing devices 1470, 1480 may include integrated memory and I/O control logic ("CL") 1472 and 1482, respectively. For at least one implementation, the CL 1472, 1482 may include integrated memory controller units such as described herein. In addition CL 1472, 1482 may also include I/O control logic. FIG. 14 illustrates that the memories 1432, 1434 are coupled to the CL 1472, 1482 and that I/O devices 1514 are also coupled to the control logic 1472, 1482. Legacy I/O devices 1515 are coupled to the chipset 1490. The implementations of the providing isolation in virtualized systems using trust domains can be implemented in processing device 1470, processing device 1480, or both.

Figure 16:
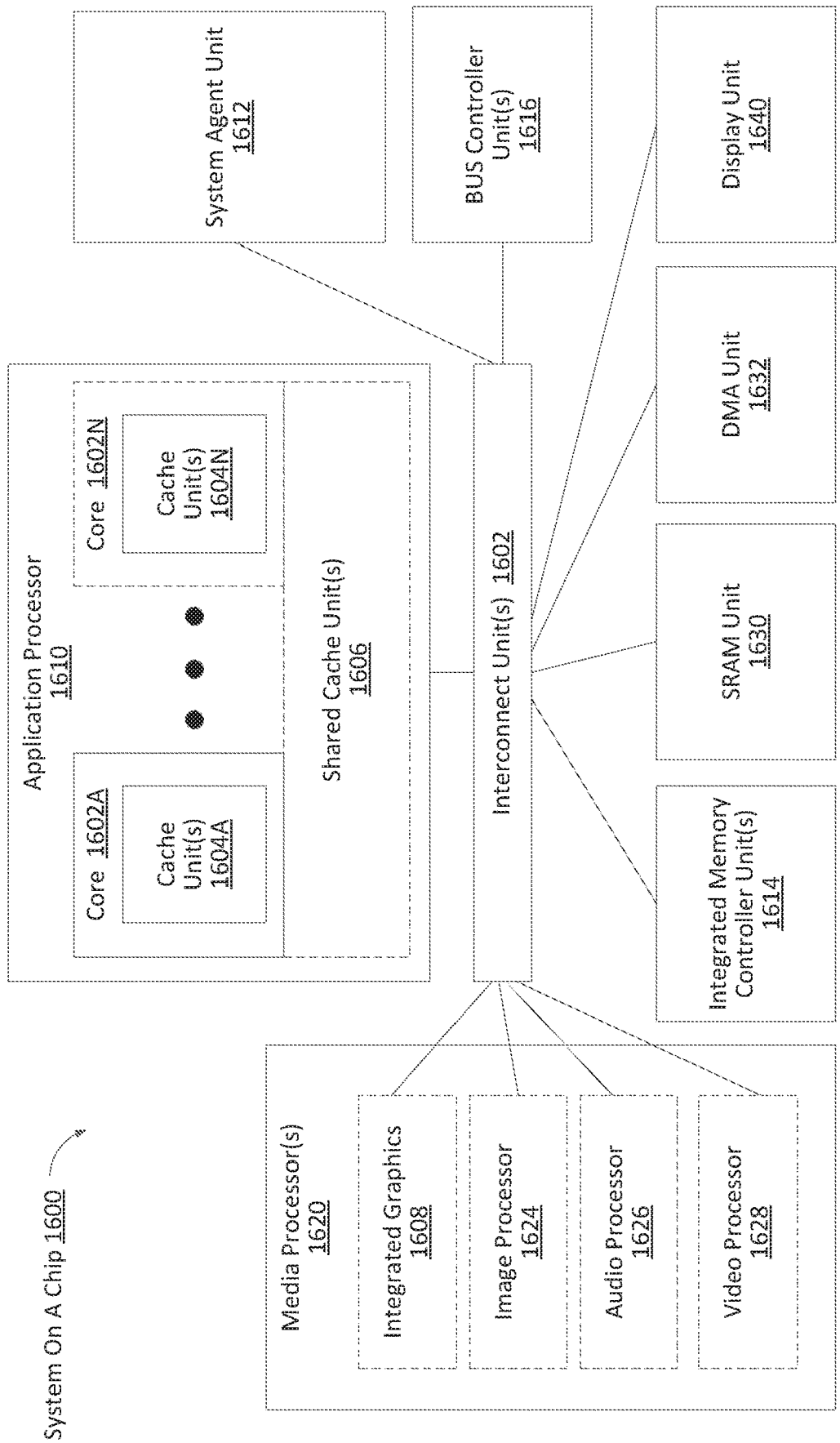
FIG. 16 illustrates a block diagram of a system-on-a-chip (SoC), according to embodiments of the present disclosure.

FIG. 16 is an example system on a chip (SoC) that may include one or more cores 1602. Other system designs and configurations known in the arts for laptops, desktops, handheld PCs, personal digital assistants, engineering workstations, servers, network devices, network hubs, switches, embedded processing devices, digital signal processing devices (DSPs), graphics devices, video game devices, set-top boxes, micro controllers, cell phones, portable media players, hand held devices, and various other electronic devices, are also suitable. In general, a huge variety of systems or electronic devices capable of incorporating a processing device and/or other execution logic as disclosed herein are generally suitable.

Referring now to FIG. 16, shown is a block diagram of a SoC 1600 in accordance with implementations of the disclosure. Also, dashed lined boxes are features on more advanced SoCs. In FIG. 16, an interconnect unit(s) 1602 is coupled to: an application processing device 1600 which includes a set of one or more cores 1602A-N and shared cache unit(s) 1606; a system agent unit 1612; a bus controller unit(s) 1616; an integrated memory controller unit(s) 1614; a set of one or more media processing devices 1620 which may include integrated graphics logic 1608, an image processing device 1624 for providing still and/or video camera functionality, an audio processing device 1626 for providing hardware audio acceleration, and a video processing device 1628 for providing video encode/decode acceleration; a static random access memory (SRAM) unit 1630; a direct memory access (DMA) unit 1632; and a display unit 1640 for coupling to one or more external displays. The implementations of providing isolation in virtualized systems using trust domains can be implemented in SoC 1600.

Figure 17:
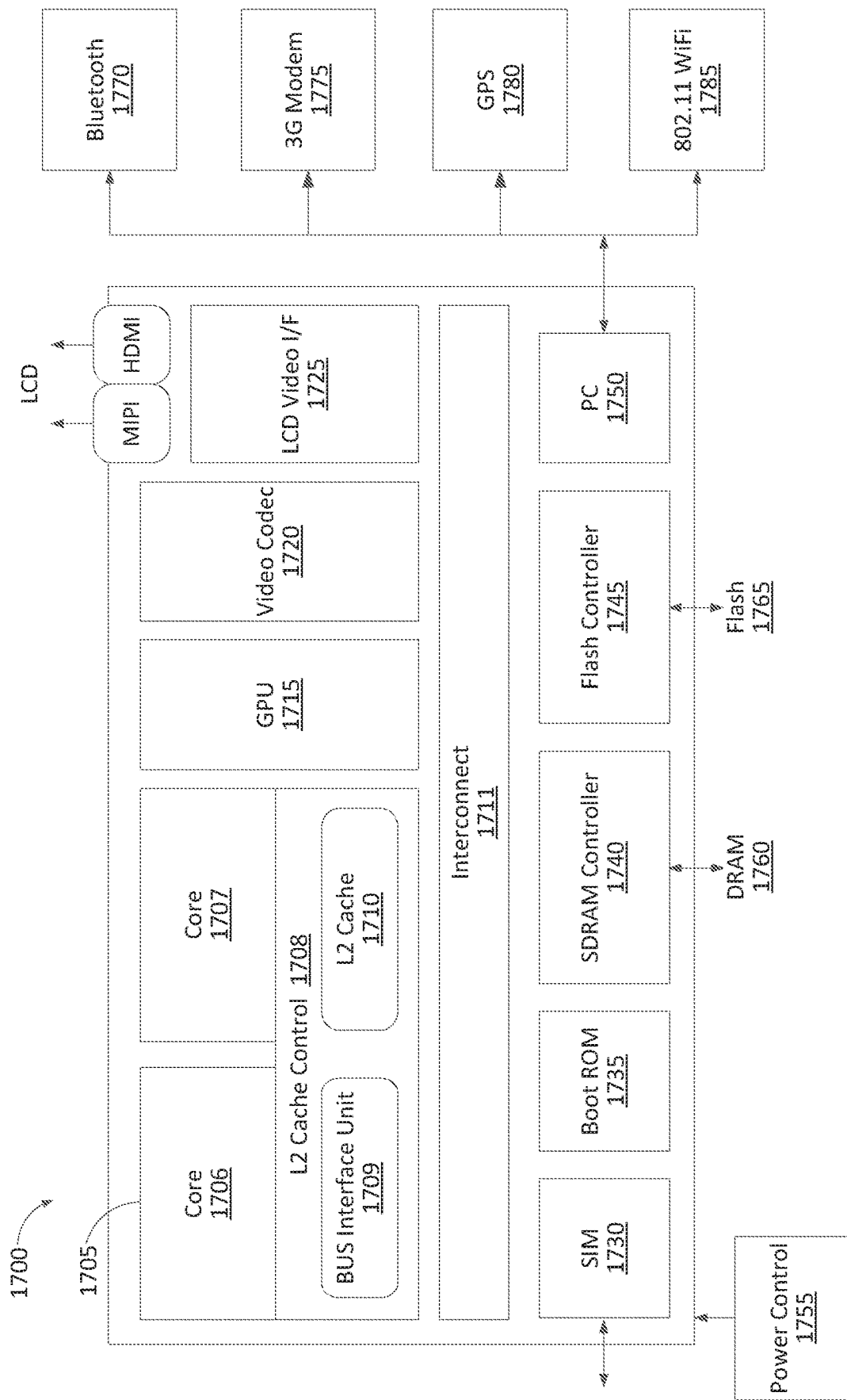
FIG. 17 illustrates another implementation of a block diagram for a computing system, according to embodiments of the present disclosure.

Turning next to FIG. 17, an implementation of an SoC design in accordance with implementations of the disclosure is depicted. As an illustrative example, SoC 1700 is included in user equipment (UE). In one implementation, UE refers to any device to be used by an end-user to communicate, such as a hand-held phone, smartphone, tablet, ultra-thin notebook, notebook with broadband adapter, or any other similar communication device. UE may connect to a base station or node, which can correspond in nature to a mobile station (MS) in a GSM network. The implementations of providing isolation in virtualized systems using trust domains can be implemented in SoC 1600.

Here, SoC 1720 includes 2 cores—1706 and 1707. Similar to the discussion above, cores 1706 and 1707 may conform to an Instruction Set Architecture, such as a processing device having the Intel® Architecture Core™, an Advanced Micro Devices, Inc. (AMD) processing device, a MIPS-based processing device, an ARM-based processing device design, or a customer thereof, as well as their licensees or adopters. Cores 1706 and 1707 are coupled to cache control 1708 that is associated with bus interface unit 1709 and L2 cache 1710 to communicate with other parts of system 1700. Interconnect 1711 includes an on-chip interconnect, such as an IOSF, AMBA, or other interconnects discussed above, which can implement one or more aspects of the described disclosure.

Interconnect 1711 provides communication channels to the other components, such as a Subscriber Identity Module (SIM) 1730 to interface with a SIM card, a boot ROM 1735 to hold boot code for execution by cores 1706 and 1707 to initialize and boot SoC 1700, a SDRAM controller 1740 to interface with external memory (e.g., DRAM 1760), a flash controller 1745 to interface with non-volatile memory (e.g., Flash 1765), a peripheral control 1750 (e.g., Serial Peripheral Interface) to interface with peripherals, video codecs

1720 and Video interface 1725 to display and receive input (e.g., touch enabled input), GPU 1715 to perform graphics related computations, etc. Any of these interfaces may incorporate aspects of the implementations described herein.

In addition, the system illustrates peripherals for communication, such as a Bluetooth module 1770, 3G modem 1775, GPS 1780, and Wi-Fi 1785. Note as stated above, a UE includes a radio for communication. As a result, these peripheral communication modules may not all be included. However, in a UE some form of a radio for external communication should be included.

Figure 18:
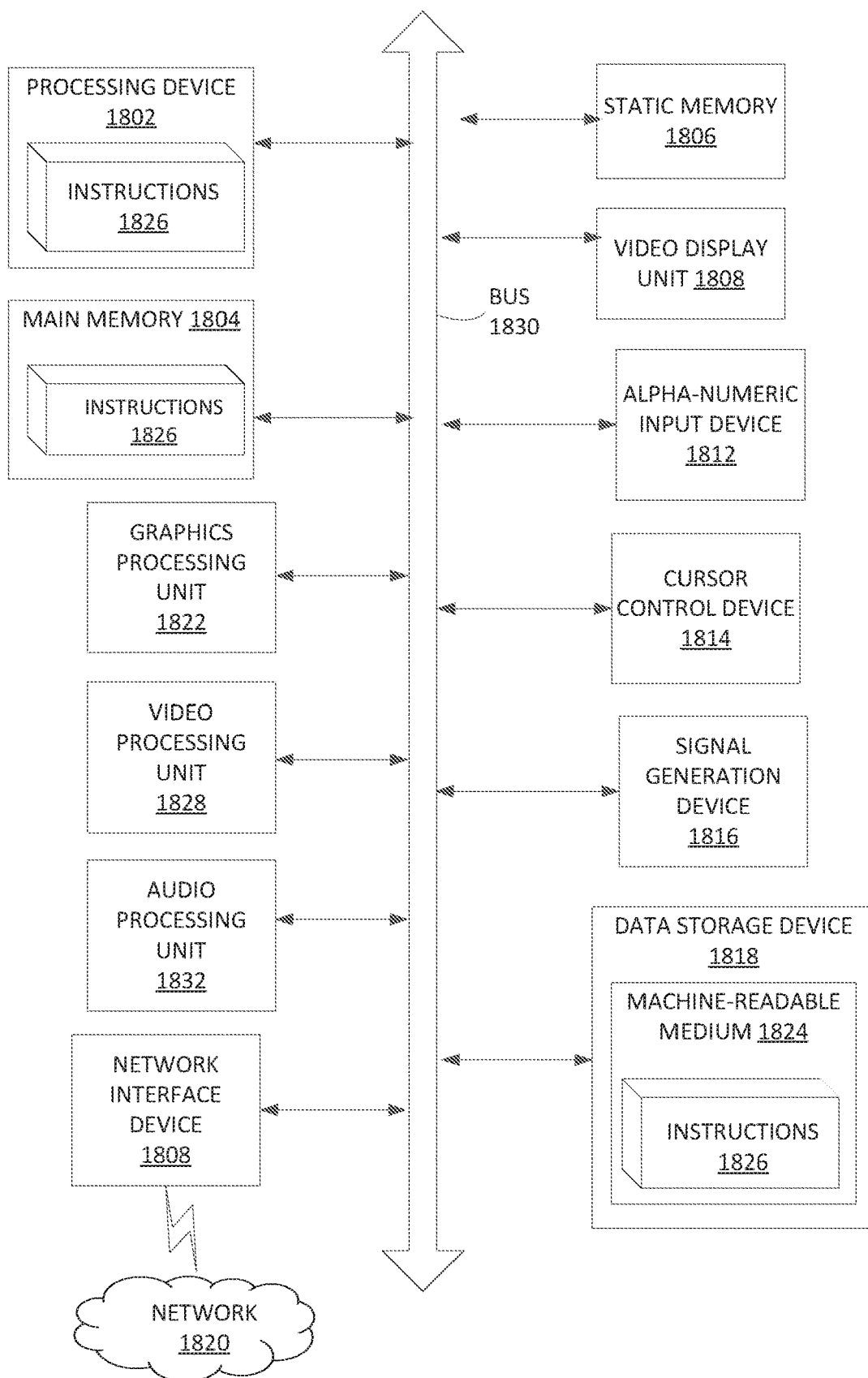
FIG. 18 illustrates another implementation of a block diagram for a computing system, according to embodiments of the present disclosure.

FIG. 18 illustrates a diagrammatic representation of a machine in the example form of a computing system 1800 within which a set of instructions for causing the machine to perform any one or more of the methodologies discussed herein may be executed. In alternative implementations, the machine may be connected (e.g., networked) to other machines in a LAN, an intranet, an extranet, or the Internet. The machine may operate in the capacity of a server or a client device in a client-server network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The implementations of the converting pages and sections can be implemented in computing system 1800.

The computing system 1800 includes a processing device 1802, main memory 1804 (e.g., read-only memory (ROM), flash memory, dynamic random access memory (DRAM) (such as synchronous DRAM (SDRAM) or DRAM (RDRAM), etc.), a static memory 1806 (e.g., flash memory, static random access memory (SRAM), etc.), and a data storage device 1818, which communicate with each other via a bus 1830.

Processing device 1802 represents one or more general-purpose processing devices such as a microprocessing device, central processing unit, or the like. More particularly, the processing device may be complex instruction set computing (CISC) microprocessing device, reduced instruction set computing (RISC) microprocessing device, very long instruction word (VLIW) microprocessing device, or processing device implementing other instruction sets, or processing devices implementing a combination of instruction sets. Processing device 1802 may also be one or more special-purpose processing devices such as an application specific integrated circuit (ASIC), a field programmable gate array (FPGA), a digital signal processing device (DSP), a network processing device, or the like. In one implementation, processing device 1802 may include one or more processing device cores. The processing device 1802 is configured to execute the processing logic 1826 for performing the operations discussed herein. In one implementation, processing device 1802 can be part of the computing system 100 of FIGS. 1A and 1B. Alternatively, the computing system 1800 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1800 may further include a network interface device 1808 communicably coupled to a network 1820. The computing system 1800 also may include a video display unit 1810 (e.g., a liquid crystal display (LCD) or a cathode ray tube (CRT)), an alphanumeric input device 1812 (e.g., a keyboard), a cursor control device 1814 (e.g., a mouse), a signal generation device 1816 (e.g., a speaker), or other peripheral devices. Furthermore, computing system 1800 may include a graphics processing unit 1822, a video processing unit 1828 and an audio processing unit 1832. In another implementation, the computing system 1800 may include a chipset (not illustrated), which refers to a group of integrated circuits, or chips, that are designed to work with the processing device 1802 and external devices. For example, the chipset may be a set of chips on a motherboard that links the processing device 1802 to very high-speed devices, such as main memory 1804 and graphic controllers, as well as linking the processing device 1802 to lower-speed peripheral buses of peripherals, such as USB, PCI or ISA buses.

The data storage device 1818 may include a computer-readable storage medium 1824 on which is stored software 1826 embodying any one or more of the methodologies of functions described herein. The software 1826 may also reside, completely or at least partially, within the main memory 1804 as instructions 1826 and/or within the processing device 1802 as processing logic 1826 during execution thereof by the computing system 1800; the main memory 1804 and the processing device 1802 also constituting computer-readable storage media.

The computer-readable storage medium 1824 may also be used to store instructions 1826 utilizing the processing device 1802, such as described with respect to FIGS. 1A and 1B, and/or a software library containing methods that call the above applications. While the computer-readable storage medium 1824 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the implementations. The term "computer-readable storage medium" shall accordingly be taken to include, but not be limited to, solid-state memories, and optical and magnetic media.

The following examples pertain to further implementations.

Example 1 is a processing device comprising a multi-key total memory encryption (MK-TME) circuit; an on-chip memory to store a key ownership table (KOT), wherein the on-chip memory is not directly accessible by software executed by the processing device; and a processing core that is to execute a trust domain resource manager (TDRM), wherein the TDRM is to: initialize a trust domain control structure (TDCS) associated with a trust domain (TD); initialize a trust domain protected memory (TDPM) associated with the TD; generate a one-time cryptographic key; identify an available host key identifier (HKID) in the KOT;

assign, using the MK-TME circuit, the available HKID to the one-time cryptographic key; store the HKID and the one-time cryptographic key in the TDCS; associate a logical processor to the TD; add a memory page from an address space of the logical processor to the TDPM; and transfer execution control to the logical processor to execute the TD.

In Example 2, the subject matter of Example 1, wherein assigning an identifier of a logical processor to the TD comprises allocating a memory page of the TDPM to a TD state save area (SSA) frame, wherein the TD SSA frame is bound to the logical processor; and copying a state of the logical processor to the memory page.

In Example 3, the subject matter of Example 2, wherein the TDRM is further to: allocate a first memory page of the TDPM to a first TD virtual processing space (VPS); bind the first memory page to the TDCS; and bind the memory page of the TDPM allocated to the TD SSA frame to the first memory page allocated to the first TD VPS.

In Example 4, the subject matter of Example 3, wherein the TDRM is further to designate the first TD VPS as a virtual bootstrap processor (BSP).

In Example 5, the subject matter of Example 4, wherein the TDRM is further to: allocate a second memory page of the TDPM to a second TD VPS; bind the second memory page to the TDCS; bind the memory page of the TDPM allocated to the SSA frame to the second memory page allocated to the second TD VPS; and designate the second TD VPS as a virtual application processor (AP).

In Example 6, the subject matter of Example 3, wherein transferring execution control to the logical processor to execute the TD comprises: identifying a memory page that is allocated to the logical processor; and initializing the memory page as a host page for an extended page table (EPT) of the TD.

In Example 7, the subject matter of Example 6, wherein transferring execution control to the logical processor to execute the TD further comprises: identifying a memory page that is bound to the logical processor; initializing the memory page as a host page for a TD virtual machine control structure (VMCS); activating the TD VMCS as a working VMCS of the host machine; and initializing the TD VMCS.

In Example 8, the subject matter of Example 7, wherein initializing the TD VMCS comprises: setting a state of the host page for the TD VMCS; setting a pointer to the TD EPT; and setting a link from the TD VMCS to the memory page allocated for the first VPS.

In Example 9, the subject matter of Example 1, wherein adding each memory page from an address space of the logical processor to the TDPM comprises: encrypting, using the one-time cryptographic key, the memory page; identifying a target page of the TDPM; and copying the memory page to the target page of the TDPM.

In Example 10, the subject matter of Example 1, wherein the TDRM is further to: stop the TD executing on the logical processor; flush a cache entry of a cache associated with the logical processor, wherein the cache entry stores contents of a memory page of the TDPM; mark, in the KOT, the HKID assigned to the one-time cryptographic key as available for assignment to other one-time cryptographic keys; and remove the memory page from the TDPM.

In Example 11, the subject matter of Example 10, wherein each entry of a translation lookaside buffer (TLB) associated with the logical processor is flushed.

In Example 12, the subject matter of Example 10, wherein marking the HKID assigned to the ephemeral key as available comprises: marking, in the KOT, the HKID as reclaimed, determining whether each cache entry of the cache associated with the logical processor has been flushed; and responsive to determining each cache entry of the cache has been flushed, marking, in the KOT, the HKID as available for assignment to other one-time cryptographic keys.

In Example 13, a method comprising: initializing, by a processing device executing a trust domain resource manager (TDRM), a trust domain control structure (TDCS) associated with a trust domain (TD); initializing, by the processing device executing the TDRM, a trust domain protected memory (TDPM) associated with the TD; generating, by the processing device executing the TDRM, an ephemeral key; identifying, by the processing device executing the TDRM, an available host key identifier (HKID) stored in a key ownership table (KOT); assigning, by the processing device executing the TDRM, the available HKID to the ephemeral key; storing, by the processing device executing the TDRM, the HKID in the TDCS; assigning, by the processing device executing the TDRM, an identifier of a logical processor to the TD; adding, by the processing device executing the TDRM, each memory page of a plurality of memory pages selected from a host memory of a host machine to the TDPM; and transferring, by the processing device executing the TDRM, execution control to the logical processor to execute the TD.

In Example 14, the subject matter of Example 13, wherein assigning an identifier of a logical processor to the TD comprises: allocating a memory page of the TDPM to a TD state save area (SSA) frame, wherein the TD SSA frame is bound to the logical processor; and copying a state of the logical processor to the memory page.

In Example 15, the subject matter of Example 14, further comprising: allocating a page of the TDPM for a TD virtual processing space (VPS); binding the memory page to the TDCS; and binding the memory page of the TDPM allocated to the TD SSA frame to the memory page allocated for the VPS.

In Example 16, the subject matter of Example 15, wherein transferring execution control to the logical processor to execute the TD comprises: identifying a memory page that is bound to the logical processor; and initializing the memory page as a host page for a TD extended page table (EPT).

In Example 17, the subject matter of Example 16, further comprising: selecting a memory page from the TDPM that is bound to the logical processor; initializing the selected memory page as a host page for a TD virtual machine control structure (VMCS); activating the TD VMCS as a working VMCS of the host machine; and initializing the TD VMCS.

In Example 18, the subject matter of Example 17, wherein initializing the TD VMCS comprises: setting the state of the host page for the TD VMCS; setting a pointer to the TD EPT; and setting a link from the TD VMCS to the memory page allocated for the VPS.

In Example 19, the subject matter of Example 13, wherein adding a plurality of memory pages associated with the logical processor to the TDPM comprises: encrypting, using the one-time cryptographic key, the memory page; identifying a target TD page of the TDPM; and copying the memory page to the target TD page of the TDPM.

In Example 20, the subject matter of Example 19, further comprising measuring, by the processing device executing the TDRM, the memory page, wherein measuring the memory page comprises extending a TD measurement by the contents of the memory page.

In Example 21, the subject matter of Example 20, wherein the TD measurement is extended on a 256 byte chunk of the memory page.

In Example 22, a method comprising: stopping, by a processing device executing a trust domain resource manager (TDRM), a TD (trust domain) from executing on a logical processor, wherein the TD comprises a trust domain protected memory (TDPM); flushing, by the processing device executing the TDRM, a cache entry of a cache associated with the logical processor, wherein the cache entry stores contents of a memory page of the TDPM; marking in a key ownership table (KOT), by the processing device executing the TDRM, a host key ID (HKID) assigned to a one-time cryptographic key associated with the TD as available for assignment to other one-time cryptographic keys; and removing, by the processing device executing the TDRM, the memory page from the TDPM.

In Example 23, the subject matter of Example 22, wherein each entry of a translation lookaside buffer (TLB) associated with the logical processor is flushed.

In Example 24, the subject matter of Example 23, wherein marking a HKID assigned to the ephemeral key as available comprises: marking in the KOT, by the processing device executing the TDRM, the HKID as reclaimed; determining, by the processing device executing the TDRM, whether each cache entry of the cache associated with the logical processor has been flushed; and responsive to determining each cache entry of the cache has been flushed, marking, in the KOT, by the processing device executing the TDRM, the HKID as available for assignment to other one-time cryptographic keys.

In Example 25, the subject matter of Example 24, further comprising removing from the TDPM, by the processing device executing the TDRM, at least one of: a memory page bound to a TD state save area (SSA) allocated to the logical processor, a memory page bound to a virtual processing space (VPS), and a memory page bound to a TD control structure (TDCS) allocated to the TD.

In Example 26, the subject matter of Example 22, wherein stopping a TD from executing on a logical processor comprises broadcasting an inter-processor interrupt to cause the TD to exit on the logical processor.

In Example 27, the subject matter of Example 22, further comprising invalidating each memory page associated with the TD from the cache associated with the logical processor.

In Example 28, the subject matter of Example 22, further comprising emptying, by a processing device executing the TDRM, a host page allocated for a TD extended page table (EPT).

In Example 29, the subject matter of Example 22, further comprising freeing, by the processing device executing the TDRM, a host page allocated for a TD virtual memory control structure (VMCS).

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler embodiments, specific expression of algorithms in code, specific power down and gating techniques/logic and other specific operational details of computer system have not been described in detail in order to avoid unnecessarily obscuring the present disclosure.

The embodiments are described with reference to access control in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible embodiments of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the operations of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "storing," "determining," "incrementing," "evicting," "updating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processing device comprising:
   a multi-key total memory encryption (MK-TME) circuit;
   an on-chip memory to store a key ownership table (KOT); and
   a processing core to execute a trust domain resource manager (TDRM) as part of a virtual machine monitor (VMM), wherein the TDRM, responsive to the processing core executing a first single instruction, is to:
      initialize a trust domain control structure (TDCS) associated with a trust domain (TD);
      initialize a trust domain protected memory (TDPM) associated with the TD;
      cause the processing core to generate a one-time cryptographic key;
      identify an available host key identifier (HKID) stored in the KOT, wherein the KOT further stores an indication of a state of the HKID;
      assign, using the MK-TME circuit, the available HKID to the one-time cryptographic key;
      store the HKID in the TDCS;
      associate a logical processor to the TD;
      add a memory page from an address space of the logical processor to the TDPM;
      encrypt the memory page using a host physical address (HPA) associated with the page and a binding operation, the binding operation to bind the memory page to the TD; and
      transfer execution control to the logical processor to execute the TD, wherein the VMM comprising the TDRM does not have access to encrypted content of the TDPM.

2. The processing device of claim 1, wherein associating a logical processor to the TD comprises:
   allocating a memory page of the TDPM to a TD state save area (SSA) frame, wherein the TD SSA frame is bound to the logical processor; and
   copying a state of the logical processor to the memory page.

3. The processing device of claim 2, wherein the TDRM is further to:
   allocate a memory page of the TDPM to a trust domain virtual processing space (TDVPS);
   bind the memory page to the TDCS; and
   bind the memory page allocated to the TD SSA frame to the memory page allocated to the TDVPS.

4. The processing device of claim 1, wherein transferring execution control to the logical processor to execute the TD comprises:
   identifying a memory page of the TDPM that is bound to the logical processor;
   initializing the memory page as a host page for a trust domain virtual machine control structure (TDVMCS);
   activating the TDVMCS as a working virtual machine control structure (VMCS); and
   initializing the TDVMCS.

5. The processing device of claim 1, wherein adding a memory page from an address space of the logical processor to the TDPM comprises:
   encrypting, using the one-time cryptographic key, the memory page;
   identifying a target page of the TDPM; and
   copying the memory page to the target page of the TDPM.

6. The processing device of claim 1, wherein the TDRM, responsive to the processing core executing a second single instruction, is further to:
   stop the TD executing on the logical processor;
   flush a cache entry of a cache associated with the logical processor, wherein the cache entry stores contents of a memory page of the TDPM;
   mark, in the KOT, the state of the HKID assigned to the one-time cryptographic key as available for assignment to other one-time cryptographic keys; and
   remove the memory page from the TDPM.

7. The processing device of claim 6, wherein each entry of a translation lookaside buffer (TLB) associated with the logical processor is flushed.

8. The processing device of claim 6, wherein marking the HKID assigned to the one-time cryptographic key as available comprises:
   marking, in the KOT, the state of the HKID as reclaimed;
   determining whether each cache entry of the cache associated with the logical processor has been flushed; and
   responsive to determining each cache entry of the cache has been flushed, marking, in the KOT, the HKID as available for assignment to other one-time cryptographic keys.

9. A method comprising:
   executing, by a processing device executing a trust domain resource manager (TDRM), a single instruction; and
   in response to executing the single instruction, causing the processing device to:
      initialize a trust domain control structure (TDCS) associated with a trust domain (TD);
      initialize a trust domain protected memory (TDPM) associated with the TD;
      generate a one-time cryptographic key;
      identify an available host key identifier (HKID) stored in a key ownership table (KOT), wherein the KOT further stores an indication of a state of the HKID;
      assign the available HKID to the one-time cryptographic key in a multi-key total memory encryption (MK-TME) engine;
      store the HKID in the TDCS;
      associate a logical processor to the TD;
      add a memory page from an address space of the logical processor to the TDPM;
      encrypt the memory page using a host physical address (HPA) associated with the page and a binding operation, the binding operation to bind the memory page to the TD; and
      transfer execution control to the logical processor to execute the TD, wherein the TDRM does not have access to encrypted content of the TDPM.

10. The method of claim 9, wherein associating a logical processor to the TD comprises:
    allocating a first memory page of the TDPM to a TD state save area (SSA) frame, wherein the TD SSA frame is bound to the logical processor; and
    copying a state of the logical processor to the first memory page.

11. The method of claim 10, further comprising:
    allocating a second memory page of the TDPM to a trust domain virtual processing space (TDVPS);
    binding the second memory page to the TDCS; and
    binding the first memory page allocated to the TD SSA frame to the second memory page allocated to the TDVPS.

12. The method of claim 11, wherein transferring execution control to the logical processor to execute the TD comprises:
   identifying a third memory page of the TDPM that is bound to the logical processor; and
   initializing the third memory page as a host page for a TD extended page table (EPT).

13. The method of claim 12, wherein transferring execution control to the logical processor to execute the TD further comprises:
   identifying a fourth memory page of the TDPM that is bound to the logical processor;
   initializing the fourth memory page as a host page for a trust domain virtual machine control structure (TDVMCS);
   activating the TDVMCS as a working virtual machine control structure (VMCS); and
   initializing the TDVMCS.

14. The method of claim 13, wherein initializing the TDVMCS comprises:
   setting a state of the host page for the TDVMCS;
   setting a pointer to the TD EPT; and
   setting a link from the TDVMCS to the memory page allocated for the TDVPS.

15. The method of claim 9, wherein adding a memory page from an address space of the logical processor to the TDPM comprises:
   encrypting, using the one-time cryptographic key, the memory page;
   identifying a target page of the TDPM; and
   copying the memory page to the target page of the TDPM.

16. The method of claim 15, further comprising measuring, by the processing device executing the TDRM, the memory page by extending a TD measurement by a content of the memory page.

17. A method comprising:
   executing, by a processing device executing a trust domain resource manager (TDRM), a single instruction; and
   in response to executing the single instruction, causing the processing device to:
      stop a trust domain (TD) from executing on a logical processor, wherein the TD comprises a trust domain protected memory (TDPM), wherein the TDPM comprises a memory page encrypted using a host physical address (HPA) associated with the page and a binding operation, wherein the memory page is bound to the TD using the binding operation, and wherein the TDRM does not have access to encrypted content of the TDPM;
      flush a cache entry of a cache associated with the logical processor, wherein the cache entry stores contents of a memory page of the TDPM;
      mark by the processing device executing the TDRM, a state of a host key ID (HKID) assigned to a one-time cryptographic key associated with the TD as available for assignment to other one-time cryptographic keys; and
      remove the memory page from the TDPM.

18. The method of claim 17, wherein each entry of a translation lookaside buffer (TLB) associated with the logical processor is flushed.

19. The method of claim 17, wherein marking the HKID assigned to the one-time cryptographic key as available comprises:
   marking, in the KOT, the state of the HKID as reclaimed;
   determining whether each cache entry of the cache associated with the logical processor has been flushed; and
   responsive to determining each cache entry of the cache has been flushed, marking, in the KOT, the HKID as available for assignment to other one-time cryptographic keys.

20. The method of claim 17, further comprising removing from the TDPM, by the processing device executing the TDRM, at least one of: a memory page bound to a TD save state area (SSA) allocated to a logical processor, a memory page bound to a virtual processing space (VPS), and a memory page bound to a TD control structure (TDCS) allocated to the TD.

* * * * *